US012595579B2

(12) United States Patent
Pain et al.

(10) Patent No.: US 12,595,579 B2
(45) Date of Patent: Apr. 7, 2026

(54) EMBEDDING ELECTRONIC DEVICES USING ELECTROCHEMICAL ADDITIVE MANUFACTURING

(71) Applicant: FABRIC8LABS, INC., San Diego, CA (US)

(72) Inventors: David Pain, Carlsbad, CA (US); Andrew Edmonds, Oceanside, CA (US)

(73) Assignee: FABRIC8LABS, INC., San Diego, CA (US)

( * ) Notice: Subject to any disclaimer, the term of this patent is extended or adjusted under 35 U.S.C. 154(b) by 516 days.

(21) Appl. No.: 18/165,200

(22) Filed: Feb. 6, 2023

(65) Prior Publication Data

US 2024/0076791 A1     Mar. 7, 2024

Related U.S. Application Data

(63) Continuation-in-part of application No. 17/903,966, filed on Sep. 6, 2022, now Pat. No. 11,920,251.
(Continued)

(51) Int. Cl.
*C25D 1/00*      (2006.01)
*B33Y 10/00*     (2015.01)

(52) U.S. Cl.
CPC .............. *C25D 1/003* (2013.01); *B33Y 10/00* (2014.12)

(58) Field of Classification Search
None
See application file for complete search history.

(56) References Cited

U.S. PATENT DOCUMENTS 4,575,330 A    3/1986  Hull
4,678,282 A    7/1987  Yaniv et al.
(Continued)

FOREIGN PATENT DOCUMENTS

CN      104178782      12/2014
CN      204097583       1/2015
(Continued)

OTHER PUBLICATIONS

Frey et al., "Switch-matrix-based High-Density Microelectrode Array in CMOS Technology", IEEE Journal of Solid-State-Circuits, Feb. 2010, pp. 467-482, vol. 45, No. 2.
(Continued)

*Primary Examiner* — Louis J Rufo
(74) *Attorney, Agent, or Firm* — Kunzler Bean & Adamson

(57)     ABSTRACT

An electrochemical additive manufacturing method includes coupling a first electronic device to a build plate and positioning the build plate into an electrolyte solution. The method also includes positioning a deposition anode array into the electrolyte solution, connecting the cathode portion of the build plate and one or more deposition anodes of the abide array to a power source. The method also includes transmitting electrical energy from the power source, through the one or more deposition anodes, through the electrolyte solution, and to the cathode portion of the build plate, such that material is deposited onto the cathode portion and forms at least a sidewall of a shell that encases the first electronic device against the build plate when the first electronic device is coupled to the build plate. The shell and the first electronic device form a second electronic device.

24 Claims, 16 Drawing Sheets

Related U.S. Application Data

(60) Provisional application No. 63/478,522, filed on Jan. 5, 2023.

(56) References Cited

U.S. PATENT DOCUMENTS

| | | | |
|---|---|---|---|
| 5,132,820 | A | 7/1992 | Someya et al. |
| 5,403,460 | A | 4/1995 | Sala et al. |
| 5,641,391 | A | 6/1997 | Hunter et al. |
| 5,998,805 | A | 12/1999 | Shi et al. |
| 6,036,834 | A | 3/2000 | Clerc |
| 7,839,831 | B2 | 11/2010 | Vrcelj et al. |
| 8,168,540 | B1 | 5/2012 | Reid et al. |
| 8,681,077 | B2 | 3/2014 | Kimura |
| 9,777,385 | B2 | 10/2017 | Wirth et al. |
| 10,465,307 | B2 | 11/2019 | Pain et al. |
| 10,724,146 | B1 | 7/2020 | Pain et al. |
| 10,914,000 | B1 | 2/2021 | Pain et al. |
| 10,947,632 | B1 | 3/2021 | Pain et al. |
| 11,232,956 | B2 | 1/2022 | Pain et al. |
| 11,313,035 | B2 | 4/2022 | Pain et al. |
| 11,313,036 | B2 | 4/2022 | Pain et al. |
| 11,401,603 | B2 | 8/2022 | Pain et al. |
| 2001/0014409 | A1 | 8/2001 | Cohen |
| 2003/0006133 | A1 | 1/2003 | Metzger |
| 2004/0129573 | A1* | 7/2004 | Cohen .................... B33Y 10/00 |
| | | | 205/183 |
| 2004/0134788 | A1 | 7/2004 | Cohen et al. |
| 2005/0045252 | A1 | 3/2005 | Yamasaki et al. |
| 2005/0176238 | A1 | 8/2005 | Cohen et al. |
| 2005/0183959 | A1 | 8/2005 | Wilson et al. |
| 2005/0202660 | A1 | 9/2005 | Cohen et al. |
| 2005/0221529 | A1* | 10/2005 | Bang ..................... C25D 1/003 |
| | | | 438/622 |
| 2005/0223543 | A1 | 10/2005 | Cohen et al. |
| 2006/0134831 | A1 | 6/2006 | Cohen et al. |
| 2006/0283539 | A1 | 12/2006 | Slafer |
| 2007/0068819 | A1 | 3/2007 | Singh et al. |
| 2007/0089993 | A1 | 4/2007 | Schwartz et al. |
| 2007/0221504 | A1 | 9/2007 | Yuefeng |
| 2010/0300886 | A1 | 12/2010 | Lin et al. |
| 2011/0210005 | A1 | 9/2011 | Van Den Bossche et al. |
| 2017/0145584 | A1 | 5/2017 | Wirth et al. |
| 2019/0160594 | A1 | 5/2019 | Flamm et al. |
| 2021/0047744 | A1 | 2/2021 | Biton |
| 2021/0348288 | A1 | 11/2021 | Ellyahu |

FOREIGN PATENT DOCUMENTS

| | | |
|---|---|---|
| CN | 104593830 | 5/2015 |
| WO | 2017087884 | 5/2017 |
| WO | 2019150362 | 8/2019 |
| WO | 2021041265 | 3/2021 |

OTHER PUBLICATIONS

Stewart et al., "Polysilicon TFT Technology for Active Matrix OLED Displays", IEEE Transactions on Electron Devices, May 2001, pp. 845-851, vol. 48, No. 5.

International Search Report and Written Opinion for PCT/US2020/047531 dated Sep. 29, 2020.

Supplementary International Search Report for PCT/US2020/04753I dated Nov. 22, 2021.

U.S. Appl. No. 17/554,677, filed Dec. 17, 2021.

U.S. Appl. No. 17/566,546, filed Dec. 30, 2021.

U.S. Appl. No. 17/535,437, filed Nov. 24, 2021.

U.S. Appl. No. 17/738,729, filed May 6, 2022.

U.S. Appl. No. 17/863,272, filed Jul. 12, 2022.

Nakamura et al., Incorporation of input function into displays using LTPS TFT technology, Journal of the SID, 2006, pp. 363-369, 14/4.

* cited by examiner

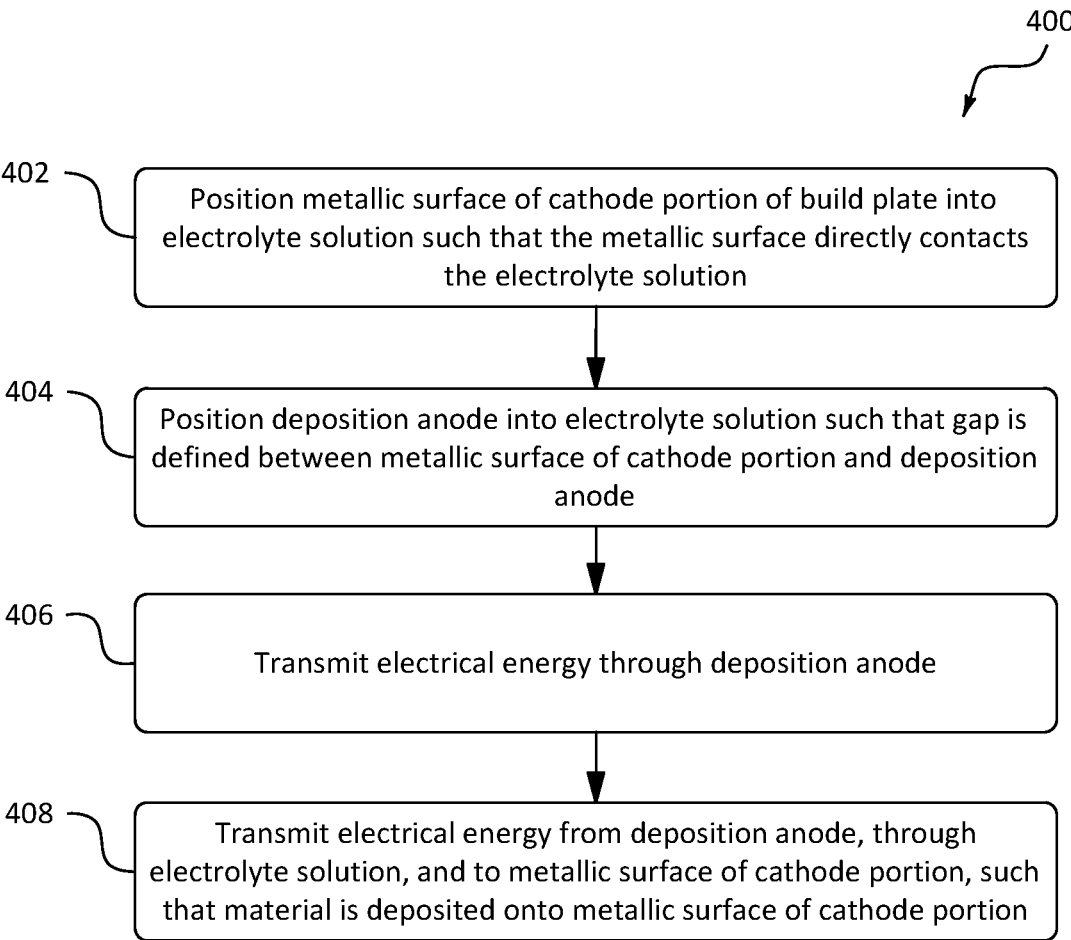

400

402 — Position metallic surface of cathode portion of build plate into electrolyte solution such that the metallic surface directly contacts the electrolyte solution 404 — Position deposition anode into electrolyte solution such that gap is defined between metallic surface of cathode portion and deposition anode 406 — Transmit electrical energy through deposition anode 408 — Transmit electrical energy from deposition anode, through electrolyte solution, and to metallic surface of cathode portion, such that material is deposited onto metallic surface of cathode portion

FIG. 12

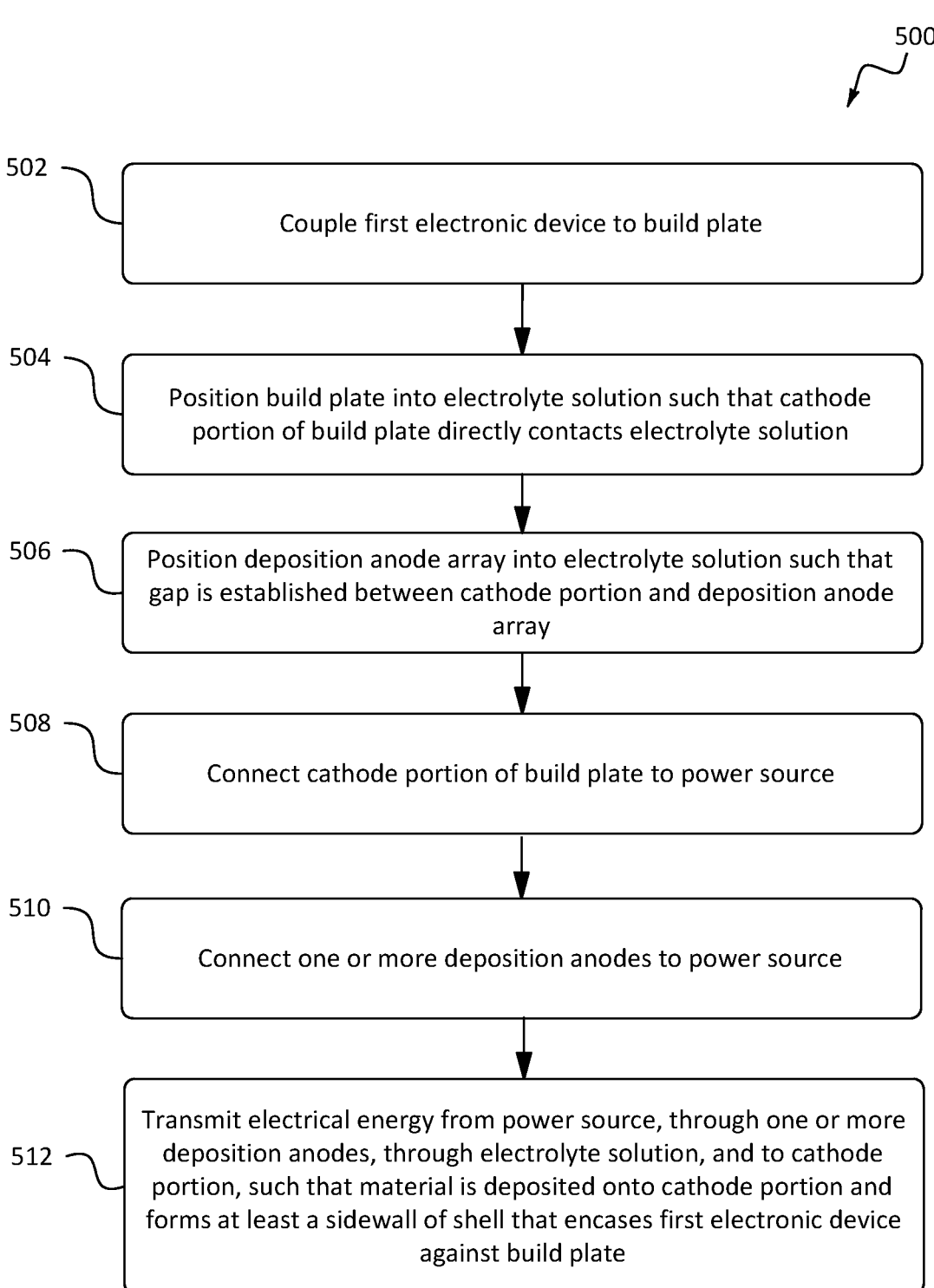

500

502 — Couple first electronic device to build plate

504 — Position build plate into electrolyte solution such that cathode portion of build plate directly contacts electrolyte solution 506 — Position deposition anode array into electrolyte solution such that gap is established between cathode portion and deposition anode array 508 — Connect cathode portion of build plate to power source 510 — Connect one or more deposition anodes to power source 512 — Transmit electrical energy from power source, through one or more deposition anodes, through electrolyte solution, and to cathode portion, such that material is deposited onto cathode portion and forms at least a sidewall of shell that encases first electronic device against build plate

FIG. 13

EMBEDDING ELECTRONIC DEVICES USING ELECTROCHEMICAL ADDITIVE MANUFACTURING

CROSS-REFERENCE TO RELATED APPLICATIONS

This application is a continuation-in-part of U.S. patent application Ser. No. 17/903,966, filed Sep. 6, 2022, and claims the benefit of U.S. Provisional Patent Application No. 63/478,522, filed Jan. 5, 2023, which are incorporated herein by reference in their entirety.

GOVERNMENT LICENSE RIGHTS

This invention was made with government support under AEDC contract number FA8649-20-9-9117 awarded by the United States Air Force. The government has certain rights in the invention.

FIELD

This disclosure relates generally to manufacturing parts, and more particularly to systems and methods for manufacturing parts using electrochemical additive manufacturing techniques.

BACKGROUND

For some applications, embedding an electronic device within a metallic structure is desired. For example, according to one conventional process, an electronic device can be positioned between sheets of metal tape and the sheets are welded together.

Processes for embedding electronic devices within metallic structures can be limited, particularly for temperature-sensitive electronic devices, because many conventional processes, such as powder bed fusion-based metal additive manufacturing processes, generate temperatures that can damage the electronic devices.

Ultrasonic additive manufacturing is a conventional process that generates lower temperatures. However, the high vibrations induced during ultrasonic additive manufacturing processes can damage the electronic devices, particularly those that are vibration-sensitive.

SUMMARY

The subject matter of the present application has been developed in response to the present state of the art, and in particular, in response to the shortcomings of conventional systems and methods for additive manufacturing of parts, that have not yet been fully solved by currently available techniques. Accordingly, the subject matter of the present application has been developed to provide systems and methods for the electrochemical additive manufacturing of parts that overcome at least some of the above-discussed shortcomings of prior art techniques.

The following is a non-exhaustive list of examples, which may or may not be claimed, of the subject matter, disclosed herein.

Disclosed herein is an electrochemical additive manufacturing method. The method comprises a step of coupling a first electronic device to a build plate. The method further comprises a step of positioning the build plate into an electrolyte solution such that a cathode portion of the build plate directly contacts the electrolyte solution. The method also comprises a step of positioning a deposition anode array, comprising a plurality of deposition anodes, into the electrolyte solution such that a gap is established between the cathode portion and the deposition anode array. The method additionally comprises a step of connecting the cathode portion of the build plate to a power source. The method further comprises a step of connecting one or more deposition anodes of the plurality of deposition anodes to the power source. The method also comprises a step of transmitting electrical energy from the power source, through the one or more deposition anodes of the plurality of deposition anodes, through the electrolyte solution, and to the cathode portion of the build plate, such that material is deposited onto the cathode portion and forms at least a sidewall of a shell that encases the first electronic device against the build plate when the first electronic device is coupled to the build plate. The shell and the first electronic device form a second electronic device. The preceding subject matter of this paragraph characterizes example 1 of the present disclosure.

The material forms an entirety of the shell that encases the first electronic device against the build plate. The preceding subject matter of this paragraph characterizes example 2 of the present disclosure, wherein example 2 also includes the subject matter according to example 1, above.

The electrochemical additive manufacturing method further comprises applying a second material onto the sidewall and over the first electronic device to form a top of the shell. The preceding subject matter of this paragraph characterizes example 3 of the present disclosure, wherein example 3 also includes the subject matter according to any of examples 1-2, above.

The electrochemical additive manufacturing method further comprises removing the second electronic device from the build plate. The preceding subject matter of this paragraph characterizes example 4 of the present disclosure, wherein example 4 also includes the subject matter according to any of examples 1-3, above.

The step of coupling the first electronic device to the build plate comprises adhering the first electronic device to the build plate with an adhesive. The preceding subject matter of this paragraph characterizes example 5 of the present disclosure, wherein example 5 also includes the subject matter according to any of examples 1-4, above.

The adhesive is a hardenable material that is hardenable from a pliable state to a hardened state. The step of coupling the first electronic device to the build plate comprising attaching the first electronic device to the build plate with the adhesive when the adhesive is in the pliable state. The electrochemical manufacturing method further comprises, after the material is deposited onto the cathode portion, hardening the adhesive from the pliable state to the hardened state. The preceding subject matter of this paragraph characterizes example 6 of the present disclosure, wherein example 6 also includes the subject matter according to example 5, above.

The build plate comprises an aperture. The step of coupling the first electronic device to the build plate comprises positioning the first electronic device within the aperture. The preceding subject matter of this paragraph characterizes example 7 of the present disclosure, wherein example 7 also includes the subject matter according to any of examples 1-6, above.

The step of coupling the first electronic device to the build plate occurs before the step of transmitting the electrical energy from the power source through the one or more deposition anodes of the plurality of deposition anodes, through the electrolyte solution, and to the cathode portion of the build plate, such that material is deposited onto the cathode portion. The preceding subject matter of this paragraph characterizes example 8 of the present disclosure, wherein example 8 also includes the subject matter according to any of examples 1-7, above.

The material is deposited onto the cathode portion in direct contact with the first electronic device. The preceding subject matter of this paragraph characterizes example 9 of the present disclosure, wherein example 9 also includes the subject matter according to example 8, above.

The material is deposited onto the cathode portion such that a gap is defined between the material and the first electronic device. The preceding subject matter of this paragraph characterizes example 10 of the present disclosure, wherein example 10 also includes the subject matter according to example 8, above.

The step of coupling the first electronic device to the build plate occurs after the step of transmitting the electrical energy from the power source through the one or more deposition anodes of the plurality of deposition anodes, through the electrolyte solution, and to the cathode portion of the build plate, such that material is deposited onto the cathode portion. The preceding subject matter of this paragraph characterizes example 11 of the present disclosure, wherein example 11 also includes the subject matter according to any of examples 1-7, above.

The material deposited onto the cathode portion also forms a receptacle. The step of coupling the first electronic device to the build plate comprises inserting the first electronic device into the receptacle. The preceding subject matter of this paragraph characterizes example 12 of the present disclosure, wherein example 12 also includes the subject matter according to example 11, above.

The first electronic device forms a fixed fit with the receptacle. The preceding subject matter of this paragraph characterizes example 13 of the present disclosure, wherein example 13 also includes the subject matter according to example 12, above.

The electrochemical additive manufacturing method further comprises forming weep holes in the sidewall of the shell. Insertion of the first electronic device into the receptacle urges a portion of the electrolyte solution, located within the receptacle, out of the receptacle through the weep holes. The preceding subject matter of this paragraph characterizes example 14 of the present disclosure, wherein example 14 also includes the subject matter according to any of examples 12-13, above.

The weep holes are formed by selective deposition of the material onto the cathode portion. The preceding subject matter of this paragraph characterizes example 15 of the present disclosure, wherein example 15 also includes the subject matter according to example 14, above.

The weep holes are formed by removing portions of the material after the material is deposited onto the cathode portion. The preceding subject matter of this paragraph characterizes example 16 of the present disclosure, wherein example 16 also includes the subject matter according to any of examples 14-15, above.

The first electronic device comprises an electrically conductive portion. The build plate is positioned into the electrolyte solution such that the electrically conductive portion of the first electronic device directly contacts the electrolyte solution. The electrochemical additive manufacturing method further comprises connecting the electrically conductive portion of the first electronic device to the power source and transmitting electrical energy from the power source, through at least one deposition anode of the plurality of deposition anodes, through the electrolyte solution, and to the electrically conductive portion of the first electronic device, such that material is deposited onto the electrically conductive portion of the first electronic device. The preceding subject matter of this paragraph characterizes example 17 of the present disclosure, wherein example 17 also includes the subject matter according to any of examples 1-16, above.

The first electronic device comprises two electrically conductive portions electrically coupled together to form an electrical node of the first electronic device. The build plate is positioned into the electrolyte solution such that the electrical node of the first electronic device directly contacts the electrolyte solution. The electrochemical additive manufacturing method further comprises connecting the two electrically conductive portions of the first electronic device to the power source and transmitting electrical energy from the power source, through at least one deposition anode of the plurality of deposition anodes, through the electrolyte solution, and to the two electrically conductive portions of the first electronic device, such that material is deposited onto the electrical node of the first electronic device. The preceding subject matter of this paragraph characterizes example 18 of the present disclosure, wherein example 18 also includes the subject matter according to example 17, above.

The two electrically conductive portions are soldered together. The electrical node comprises soldered portions of the two electrically conductive portions. The preceding subject matter of this paragraph characterizes example 19 of the present disclosure, wherein example 19 also includes the subject matter according to example 18, above.

The two electrically conductive portions are twisted together. The electrical node comprises twisted portions of the two electrically conductive portions. The preceding subject matter of this paragraph characterizes example 20 of the present disclosure, wherein example 20 also includes the subject matter according to example 18, above.

The first electrical device is a thermocouple. The second electrical device is a calorimeter. The preceding subject matter of this paragraph characterizes example 21 of the present disclosure, wherein example 21 also includes the subject matter according to any of examples 18-20, above.

The build plate comprises a substrate, made of one of an electrically non-conductive material or a semiconductor material. The cathode portion is fixed to the substrate. The preceding subject matter of this paragraph characterizes example 22 of the present disclosure, wherein example 22 also includes the subject matter according to any of examples 1-21, above.

The first electronic device comprises a sensing device. The preceding subject matter of this paragraph characterizes example 23 of the present disclosure, wherein example 23 also includes the subject matter according to any of examples 1-22, above.

The material deposited onto the cathode portion comprises multiple layers. The steps of positioning the build plate and positioning the deposition anode array into the electrolyte solution comprises adjusting a size of the gap established between the cathode portion and the deposition anode array from a first distance to a second distance, greater than the first distance. A first layer of the multiple layers of the material is deposited onto the cathode portion when the gap is at the first distance. A second layer of the multiple layers of the material is deposited onto the first layer of the multiple layers of the material when the gap is at the second distance. The preceding subject matter of this paragraph characterizes example 24 of the present disclosure, wherein example 24 also includes the subject matter according to any of examples 1-23, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which:

FIG. 12 is a block diagram of an electrochemical additive manufacturing method, according to one or more examples of the present disclosure; and FIG. 13 is a block diagram of an electrochemical additive manufacturing method, according to one or more examples of the present disclosure.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Electrochemical additive manufacturing utilizes electrochemical reactions to manufacture parts in an additive manufacturing manner. In an electrochemical additive manufacturing process, a metal part is constructed by plating charged metal ions onto a surface of a cathode in an electrolyte solution. This technique relies on placing a deposition anode physically close to the cathode in the presence of a deposition solution (the electrolyte), and energizing the anode causing charge to flow through the anode. This creates an electrochemical reduction reaction to occur at the cathode near the anode and deposition of material on the cathode. Electrochemical additive manufacturing techniques provide distinct advantages over other types of additive manufacturing processes, such as selective laser melting and electron beam melting.

Disclosed herein are examples of an electrochemical additive manufacturing process for constructing a metal part or a metallic portion of a part by reducing charged metal ions onto a surface in an electrolyte solution. In some examples, electrochemical additive manufacturing, otherwise known as electrochemical deposition manufacturing, includes placement of a printhead, including at least one deposition anode, physically close to a cathode in the presence of a deposition solution (e.g., an electrolyte), and energizing the deposition anode, which causes an electrical charge to flow through the deposition anode. As previously mentioned, the flow of the electrical charge through the deposition anode creates an electrochemical reduction reaction to occur at the cathode, near the deposition anode, which results in the deposition of material on the cathode.

Figure 1:
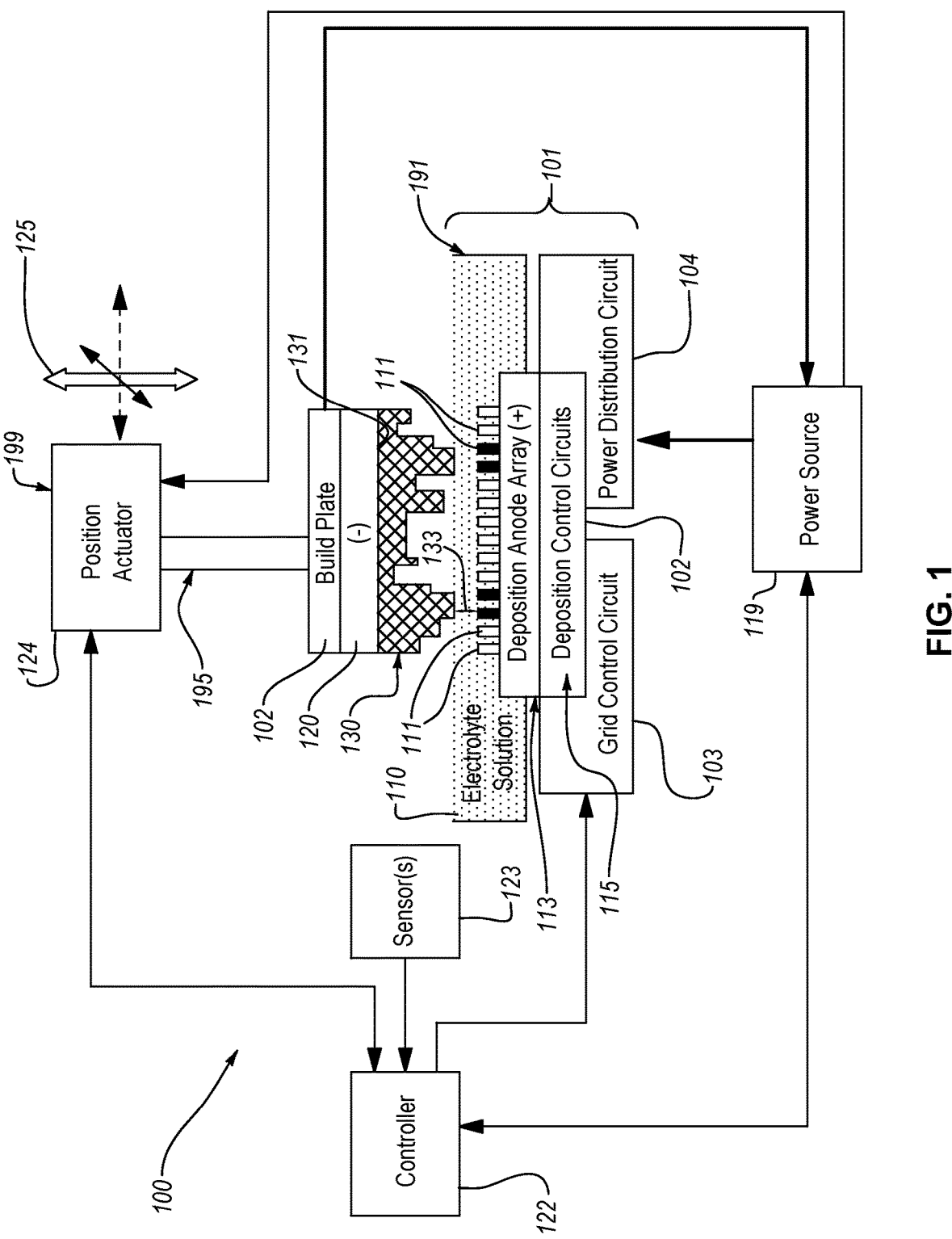
FIG. 1 is a schematic, side elevation view of an electrochemical deposition system for manufacturing a part, according to one or more examples of the present disclosure.

Referring to FIG. 1, according to some examples, an electrochemical deposition system 100 includes a printhead 101 that contains at least one deposition anode 111. In certain examples, the printhead 101 contains a plurality of deposition anodes 111 arranged into a deposition anode array 113. The printhead 101 further includes at least one deposition control circuit corresponding with the deposition anode 111. In examples where the printhead 101 contains the deposition anode array 113, the printhead 101 includes a plurality of deposition control circuits 115 where at least one of the deposition control circuits 115 corresponds with each one of the deposition anodes 111 of the deposition anode array 113. The deposition control circuits 115 are organized into a matrix arrangement, in some examples, thereby supporting a high resolution of deposition anodes 111. The deposition anodes 111 of the deposition anode array 113 are arranged to form a two-dimensional grid in some examples. In FIG. 1, one dimension of the grid is shown with the other dimension of the grid going into and/or coming out of the page.

The printhead 101 further includes a grid control circuit 103 that transmits control signals to the deposition control circuits 115 to control the amount of electrical current flowing through each one of the deposition anodes 111 of the deposition anode array 113. The printhead 101 additionally includes a power distribution circuit 104. The electrical current, supplied to the deposition anodes 111 via control of the grid control circuit 103, is provided by the power distribution circuit 104, which routes power from an electrical power source 119 of the electrochemical deposition system 100 to the deposition control circuits 115 and then to the deposition anodes 111. Although not shown, in some examples, the printhead 101 also includes features, such as insulation layers, that help protect other features of the printhead 101 from an electrolyte solution 110, as described in more detail below.

The electrochemical deposition system 100 further includes a build plate 102 and the electrolyte solution 110, which can be contained within a partially enclosed container or electrodeposition cell 191. In some examples, the electrolyte solution 110 includes one or more of, but not limited to, plating baths, associated with copper, nickel, tin, silver, gold, lead, etc., and which are typically comprised of water, an acid (such as sulfuric acid), metallic salt, and additives (such as levelers, suppressors, surfactants, accelerators, grain refiners, and pH buffers).

The electrochemical deposition system 100 is configured to move the printhead 101 relative to the electrolyte solution 110 such that the deposition anodes 111 of the deposition anode array 113 are submersed in the electrolyte solution 110. When submersed in the electrolyte solution 110, as shown in FIG. 1, when the build plate 102 and at least one of the deposition anodes 111 are connected to a power source 119, and when an electrical current is supplied to the deposition anodes 111 from the electrical power source 119, an electrical path (or current) is formed through the electrolyte solution 110 from each one of the deposition anodes 111 to a conductive surface 131 of a cathode portion 120 of the build plate 102. In such an example, the cathode portion 120 functions as the cathode the cathode-anode circuit of the electrochemical deposition system 100. The electrical paths in the electrolyte solution 110 induce electrochemical reactions in the electrolyte solution 110, between the deposition anodes 111 and the conductive surface 131 of the cathode portion 120, which results in the formation (e.g., deposition) of material 130 (e.g., layers of metal) on the conductive surface 131 of the cathode portion 120 at locations corresponding to the locations of the deposition anodes 111. The material 130, which can be layers of metal, formed by supplying electrical current to multiple deposition anodes 111 form one or more layers or portions of a part in some examples.

Multiple layers, in a stacked formation, at a given location on the cathode portion 120 of the build plate 102 can be formed by incrementally moving the build plate 102, and thus the cathode portion 120, away from the depositions anodes 111 and consecutively supplying an electrical current to the deposition anode 111 corresponding with that location. The material 130 can have an intricate and detailed shape by modifying or alternating the current flowing through the deposition anodes 111. For example, as shown in FIG. 1, first ones of the deposition anodes 111 are energized (shaded in FIG. 1), so that the material 130 is being deposited near these "energized" deposition anodes 111, when second ones of the deposition anodes are not energized (unshaded in FIG. 1), so that the material 130 is not being deposited near these "non-energized" deposition anodes 111.

In some examples, the electrochemical deposition system 100 further includes a controller 122. The printhead 101 is electrically coupled with the controller 122 such that the controller 122 can transmit electrical signals to the grid control circuit 103. In response to receipt of the electrical signals from the controller 122, the grid control circuit 103 sends corresponding electrical signals to the deposition control circuits 115 to selectively turn one or more of the deposition anodes 111 of the deposition anode array 113 on or off (or to modify the intensity of electrical current flow through each deposition anode 111). The controller 122 may be, for example and without limitation, a microcontroller, a microprocessor, a GPU, a FPGA, a SoC, a single-board computer, a laptop, a notebook, a desktop computer, a server, or a network or combination of any of these devices.

According to certain examples, the electrochemical deposition system 100 additionally includes one or more sensors 123. The controller 122 is electrically coupled with the sensors 123 to receive feedback signals from the sensors 123. The feedback signals include sensed characteristics of the electrochemical deposition system 100 that enable a determination of the progress of the metal deposition process for forming the material 130. The sensors 123 may include, for example and without limitation, current sensors, voltage sensors, timers, cameras, rangefinders, scales, force sensors, and/or pressure sensors.

One or more of the sensors 123 can be used to measure a distance between the cathode portion 120 and the deposition anode array 113. Measuring the distance between the cathode portion 120 and the deposition anode array 113 enables "zeroing" of the deposition anode array 113 relative to the cathode portion 120 before the material 130 is formed, or to set or confirm the relative position between the deposition anode(s) 111 and cathode portion 120 before forming each successive metal layer of the material 130. The accurate positioning of the cathode portion 120 relative to the deposition anode array 113 at the initialization of the deposition process may have a significant impact on the success and quality of the completed deposit. In certain examples, any of various types of sensors, for determining the distance between the cathode portion 120 and the deposition anode array 113 can be used, including, for example and without limitation, mechanical, electrical, or optical sensors, or combinations thereof. In one or more examples, mechanical sensors, such as a pressure sensor, switch, or load cell may be employed, which detects when the build plate 102, including the cathode portion 120, is moved and relocated into a desired location. In one or more examples, one or more components of the electrochemical deposition system 100 may be energized, and the cathode portion 120 may be moved into proximity of the energized components. When a corresponding voltage or current is detected on the cathode portion 120, the cathode portion 120 can be considered to be in a known location. According to some examples, other types of sensors, such as those that detect, for example, capacitance, impedance, magnetic fields, or that utilize the Hall Effect, can be used to determine the location of the cathode portion 120 relative to the deposition anode array 113.

Referring to FIG. 1, the electrochemical deposition system 100 further includes a mounting system 195 and a positioning system 199, which includes a position actuator 124. As shown in the illustrated example, the build plate 102 is coupled to the position actuator 124, or an additional or alternative position actuator of the positioning system 199, via the mounting system 195. The mounting system 195 is configured to retain the build plate 102 and to enable the cathode portion 120 of the build plate 102 to be positioned in the electrodeposition cell 191. Actuation of the position actuator 124 moves the mounting system 195 and the build plate 102 relative to the printhead 101 (and thus relative to the deposition anode array 113). However, in other examples, the printhead 101, rather than the build plate 102, is coupled to the position actuator 124 such that actuation of the position actuator 124 moves the printhead 101 relative to the build plate 102. In yet other examples, both the build plate 102 and the printhead 101 are coupled to the position actuator 124, such that actuation of the position actuator 124 results in one or both of the build plate 102 and the printhead 101 moving relative to the other.

The position actuator 124 can be a single actuator or multiple actuators that collectively form the position actuator 124. In certain examples, the position actuator 124 controls vertical movement 125, so that the build plate 102 may be raised, relative to the printhead 101, as successive layers of the material 130 are built. Alternatively, or additionally, in some examples, the position actuator 124 controls vertical movement 125, so that the printhead 101 may be lowered, relative to the build plate 102, as successive layers of the material 130 are built. In one or more examples, the position actuator 124 also moves the build plate 102, moves the printhead 101, or moves both the build plate 102 and the printhead 101 horizontally, relative to one another, so that, for example, parts having a footprint larger than the footprint of the deposition anode array 113 can be formed (see, e.g., dashed directional arrows associated with the directional arrow corresponding with the vertical movement 125).

Although not shown with particularity in FIG. 1, in one or more examples, the electrochemical deposition system 100 includes a fluid handling system fluidically coupled with the electrodeposition cell 191. The fluid handling system may include for example a tank, a particulate filter, chemically resistant tubing, and a pump. The electrochemical deposition system 100 can further include analytical equipment that enables continuous characterization of bath pH, temperature, and ion concentration using methods such as conductivity, high performance liquid chromatography, mass spectrometry, cyclic voltammetry stripping, spectrophotometer measurements, or the like. Bath conditions may be maintained with a chiller, heater and/or an automated replenishment system to replace solution lost to evaporation and/or ions of deposited material.

Although the electrochemical deposition system 100 shown in FIG. 1 has a single printhead 101 with a single deposition anode array 113, in one or more alternative examples, the electrochemical deposition system 100 includes multiple printheads 101, each with one or more deposition anode arrays 113, or a single printhead 101 with multiple deposition anode arrays 113. These multiple deposition anode arrays 113 may operate simultaneously in different chambers filled with electrolyte solution, or may be tiled in a manner where the deposition anode arrays 113 work together to deposit material on a shared build plate or series of build plates.

Referring to FIG. 12, according to some examples, an electrochemical additive manufacturing method 400 includes (block 402) positioning the conductive surface 131 of the cathode portion 120 of the build plate 102 into the electrolyte solution 110 such that the conductive surface 131 directly contacts the electrolyte solution 110. The method 400 additionally includes (block 404) positioning the deposition anode 111 into the electrolyte solution 110 such that a gap 133 is defined between the conductive surface 131 of the cathode portion 120 and the deposition anode 111. The method 400 further includes (block 406) transmitting electrical energy through the deposition anode 111. As presented above, the electrical energy can be supplied by the electrical power source 119. The method 400 also includes (block 408) transmitting the electrical energy from the deposition anode 111, through the electrolyte solution 110, and to the conductive surface 131 of the cathode portion 120, such that the material 130 is deposited onto the conductive surface 131 of the cathode portion 120. The material 130 deposited directly onto the conductive surface 131 is a first layer of the material 130.

The above-mentioned steps can be executed consecutively any number of times to deposit additional portions of the material 130 onto previously deposited layers of the material 130. Moreover, an additional layer of the material 130 can be deposited onto a previously deposited layer directly above and/or laterally offset from the previously deposited layer. In this manner, the method 400 can be executed to form the material 130 into any of various types of components that have vertical features, horizontal features, or some combination of vertical and horizontal features, such as overhangs. Some examples include columns, pillars, walls, bumps, traces, pads, horizontal layers, coils, antennas, resistors, capacitors, connectors, thermal management features, such as pins, fins, lattices, vapor chambers, heat pipes, etc.

According to some examples, the build plate 102 and the material 130 form at least a portion of a finished product 200 having a particular functionality and the build plate 102 at least partially enables the particular functionality. The material 130 is not removed from the cathode portion 120 to form the material 130 into a finished product. Additionally, the build plate 102, and the cathode portion 120 of the build plate 102, do not provide a mere nominal function in relation to the main function or functions of the finished product. For example, when the material 130 is formed into an artistic object (e.g., sculpture), the main function of the artistic object is to provide an aesthetically pleasing visual work of art. Accordingly, if the build plate 102 does not contribute to the aesthetic quality of the artistic object, such as if the build plate 102 merely provides a stand on which the artistic object is supported, the function of the build plate 102 is merely nominal compared to the main function of the artistic object and is not required to fulfill the main function of the artistic object. However, when the build plate 102 is required for the finished product to operate, then the build plate 102 at least partially enables the particular functionality of the finished product. For example, the build plate 102 can include a self-supporting structure and the material 130 forms a non-self supporting structure, such as a thin-walled structure, that is supported by the self-supporting structure.

The build plate 102 includes prefabricated features in some examples. The prefabricated features can provide any of various functionality and be pre-formed (e.g., prior to depositing the material 130 onto the build plate 102) using any of various processes, such as one or more of casting, forging, rolling, cutting, grinding, and drilling. In certain examples, the build plate 102 includes a prefabricated thermal feature that is configured to transfer heat. The material 130 deposited onto the build plate 102 is thermally coupled with the thermal feature(s) of the build plate 102 to promote heat transfer by or to the thermal feature.

Now Referring to FIGS. 2A-3B, according to some examples, the finished product 200 is a lead-frame package 250. The lead-frame package 250 includes a lead frame 240, a die 230, and a wire 234. The wire 234 is attached to and extends between the lead frame 240 and the die 230. More specifically, the wire 234 is attached to and extends between a lead-frame terminal 244 of the lead frame 240 and a die terminal 232 of the die 230. When attached to the lead-frame terminal 244 and the die terminal 232, the wire 234 electrically couples the die 230 to the lead frame 240. The die 230 includes a non-conductive substrate 231 and the die terminal 232, which is made of a conductive material, is formed in or on the non-conductive substrate 231. Similarly, the lead frame 240 includes a non-conductive substrate 242 and the lead-frame terminal 244, which is made of a conductive material, is formed in or on the non-conductive substrate 242. Some examples may include other semiconductor packaging substrate types such as ceramic-based (DBC), laminate-based (BGA), glass (interposer), etc.

The die 230 is an integrated circuit (e.g., semiconductor die) in some examples. Accordingly, in such examples, the non-conductive substrate 231 is made of a semiconducting material and the die 230 includes a functional circuit formed into the semiconducting material.

As illustrated, in some examples, the die 230 includes a plurality of die terminals 232, the lead frame 240 includes a plurality of lead-frame terminals 244, and the lead-frame package 250 includes a plurality of wires 234. Each one of the plurality of wires 234 is attached to and electrically connects a corresponding one of the plurality of die terminals 232 to a corresponding one of the plurality of lead-frame terminals 244. In one example, the plurality of die terminals 232 are arranged around a perimeter of the die 230 and the plurality of lead-frame terminals 244 are arranged around the die 230, such that the die 230 is surrounded by the lead-frame terminals 244 and the wires 234 are attached to and extend from all sides of the die 230.

Figures 2A, 2B, 2C:
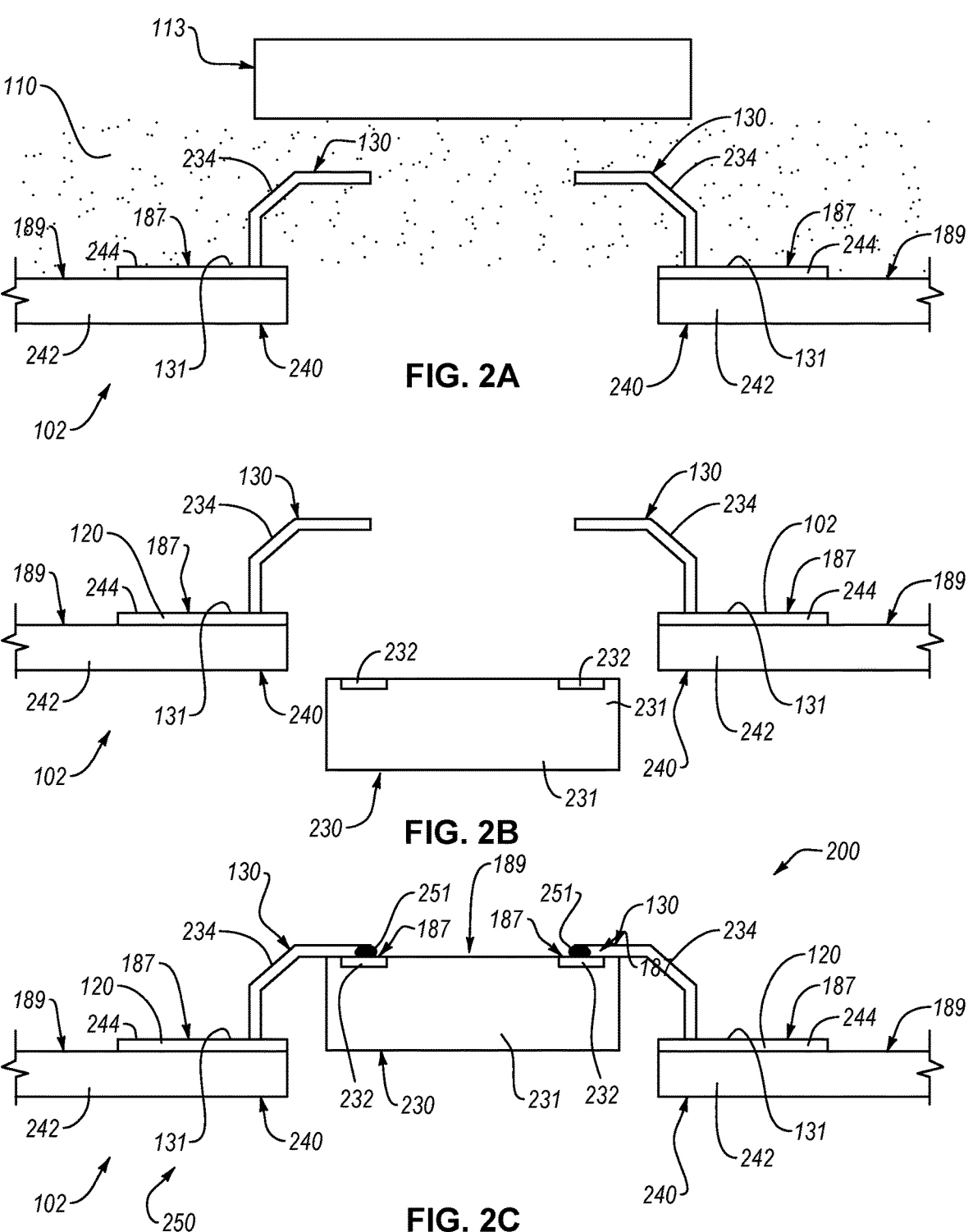
FIG. 2A is a schematic, side elevation view of material being deposited onto a cathode portion of a build plate using the system of FIG. 1, according to one or more examples of the present disclosure.
FIG. 2B is a schematic, side elevation view of a lead frame package being assembled, according to one or more examples of the present disclosure.
FIG. 2C is a schematic, side elevation view of a lead frame package made by and including a cathode portion of a build plate of the system of FIG. 1, according to one or more examples of the present disclosure.

In one example, shown in FIGS. 2A-2C, the build plate 102 forms only the lead frame 240 and the material 130 deposited onto the lead frame 240 forms the entirety of the wire 234 or the wires 234 of the lead-frame package 250. The cathode portion 120 of the build plate 102 in FIGS. 2A-2C forms only a portion of the build plate 102. More specifically, the cathode portion 120 is just the lead-frame terminals 244 and the conductive surface 131 is a surface of the lead-frame terminals 244, with the non-conductive substrate 242 forming a remainder of the build plate 102. As shown, the lead frame 240, acting as the build plate 102, is positioned in the electrolyte solution 110 such that a gap is defined between the lead-frame terminals 244 and the deposition anode array 113. Electrical energy is then supplied to the deposition anode array 113 such that the wires 234 form on the lead-frame terminals 244. In the present example, the wires 234 are formed with an overhang such that free ends of the wires 234 extends out over an opening or recess in the lead frame 240. After the wires 234 are completely formed, the build plate 102, which in this example is the lead frame 240, is removed from the electrolyte solution 110.

Referring to FIG. 2B, the die 230 is then moved into an attachment position in the opening or recess in the lead frame 240. Movement of the die 230 can be performed manually or automatically. In the attachment position, the die terminals 232 are in a position, relative to free ends of the wires 234 (e.g., in contact with the free ends of the wires 234), ready for attachment of free ends of corresponding ones of the wires 234 to the die terminals 232. As shown in FIG. 2C, attachment of the free ends of the wires 234 to the die terminals 232 is accomplished with solder 251 via a soldering process. In the attachment position, the die terminals 232 and the lead-frame terminals 244 can be on different planes, as shown in FIG. 2C. However, in other examples, the die terminals 232 and the lead-frame terminals 244 are on the same plane.

Although in the example shown in FIGS. 2A-2C, the build plate 102 forms only the lead frame 240, in other examples, the build plate 102 can form only the die 230. In such examples, the material 130 is deposited onto die terminals 232 of the die 230 in the presence of the electrolyte solution 110 and the material 130 forms the entirety of the wire 234 or the wires 234 of the lead-frame package 250. The wires 234 would be formed with an overhang such that free ends of the wires 234 extends out over and beyond a periphery of the die 230. After the wires 234 are completely formed, the die 230 is removed from the electrolyte solution 110 and the lead frame 240 is moved into an attachment position around the die 230. Movement of the lead frame 240 can be performed manually or automatically. In the attachment position, the lead-frame terminals 244 are in a position, relative to free ends of the wires 234 (e.g., in contact with the free ends of the wires 234), ready for attachment of free ends of corresponding ones of the wires 234 to the lead-frame terminals 244.

Figure 3A:
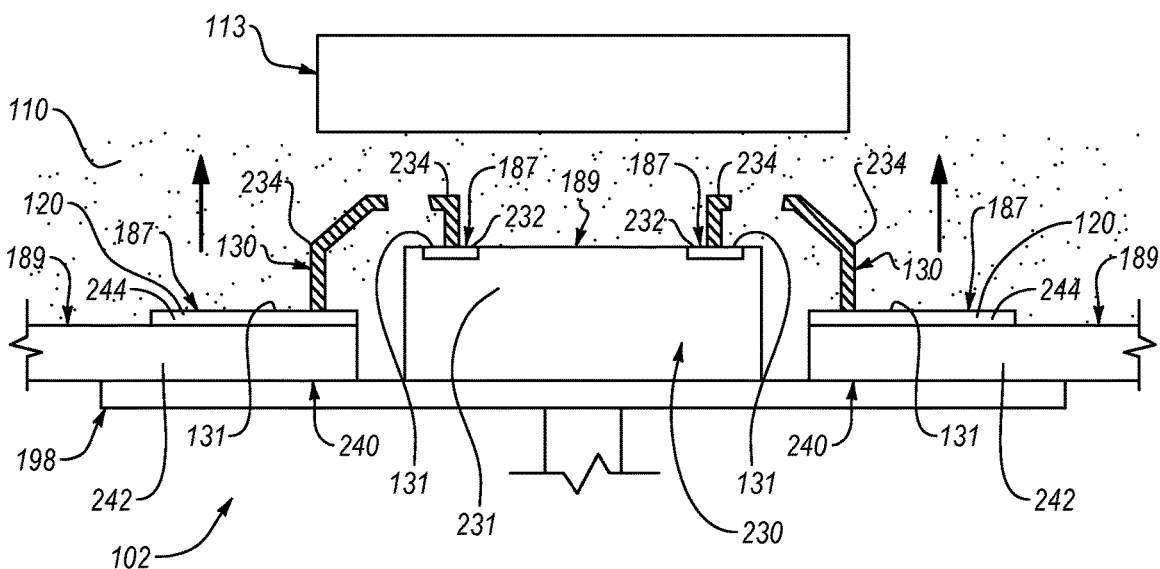
FIG. 3A is a schematic, side elevation view of material being deposited onto a cathode portion of a build plate using the system of FIG. 1, according to one or more examples of the present disclosure.
Figure 3B:
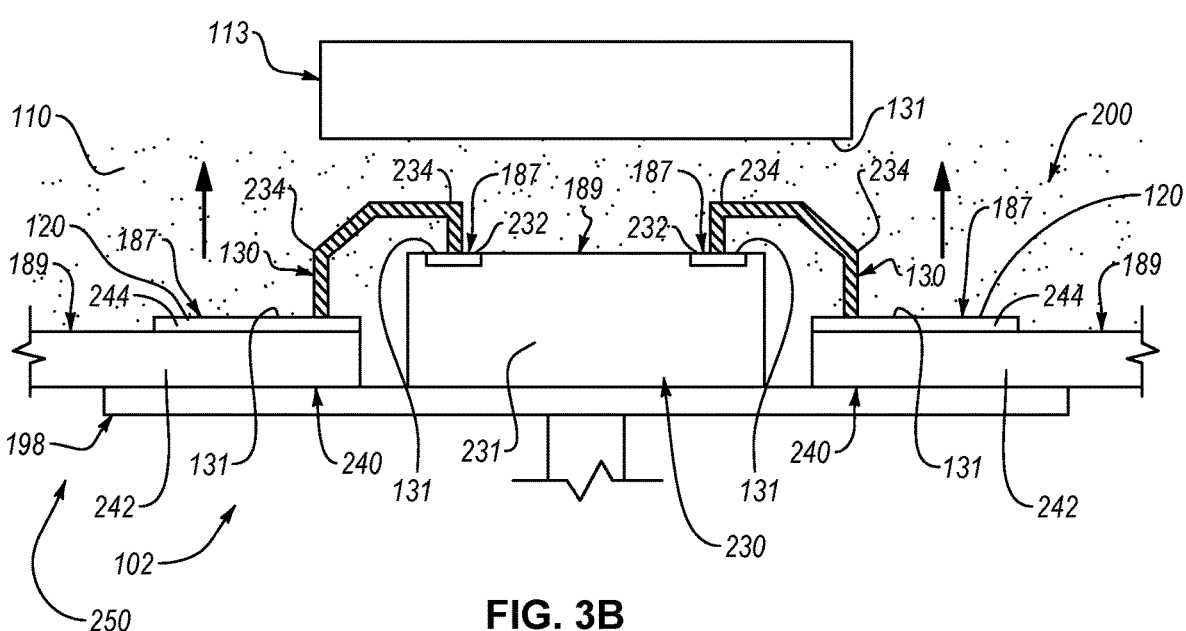
FIG. 3B is a schematic, side elevation view of a lead frame package made by and including a cathode portion of a build plate of the system of FIG. 1, according to one or more examples of the present disclosure.

Referring now to FIGS. 3A and 3B, the build plate 102 forms both the lead frame 240 and the die 230 of the lead-frame package 250, which can be supported on a support plate 198 and movable relative to the deposition anode array 113 via actuation of the support plate 198. Unlike the build plate 102 shown in FIGS. 2A-2C, in which the cathode portion 120 is formed of an entirety of the build plate 102, the cathode portion 120 of the build plate 102 in FIGS. 3A-3C forms only a portion of the build plate 102. More specifically, the cathode portion 120 is just the lead-frame terminals 244 and the die terminals 232 and the conductive surface 131 is a surface of the lead-frame terminals 244 and the die terminals 232, with the non-conductive substrate 242 and the non-conductive substrate 231 forming a remainder of the build plate 102. Accordingly, the material 130 is deposited onto both the lead-frame terminals 244 of the lead frame 240 and the die terminals 232 of the die, to form the wires 234 of the lead-frame package 250, when the lead frame 240 and the die 230 are positioned in the electrolyte solution 110. After the wires 234 are completely formed, the lead-frame package 250 is removed from the electrolyte solution 110. It can be appreciated that in the example illustrated in FIGS. 3A and 3B, solder is not required to electrically connect the wires 234 to the lead frame 240 and the die 230. The die terminals 232 and the lead-frame terminals 244 can be on different planes, as shown in FIG. 3B when the material 130 is deposited thereon to form the wires 234. However, in other examples, the die terminals 232 and the lead-frame terminals 244 are on the same plane when the material 130 is deposited thereon to form the wires 234.

Figure 4A:
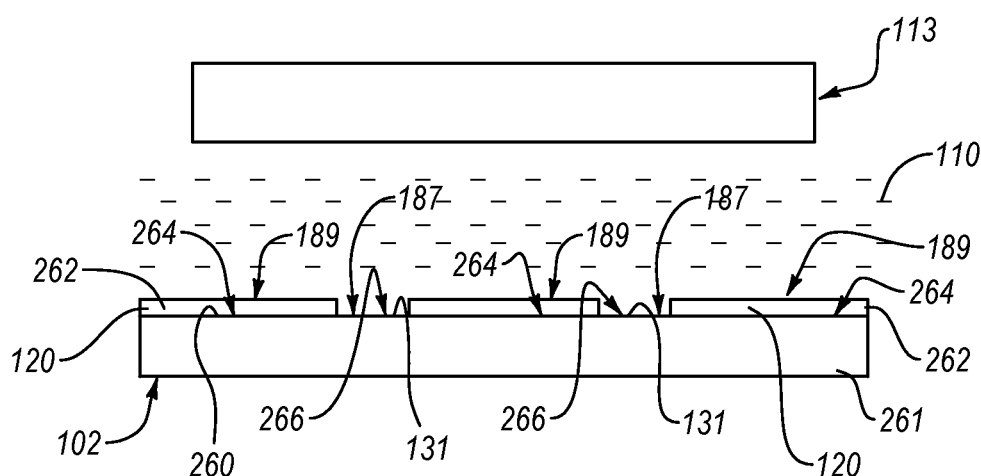
FIG. 4A is a schematic, side elevation view of a deposition anode array and cathode portion of a build plate, having a photomask layer, of the system of FIG. 1, according to one or more examples of the present disclosure.
Figure 4B:
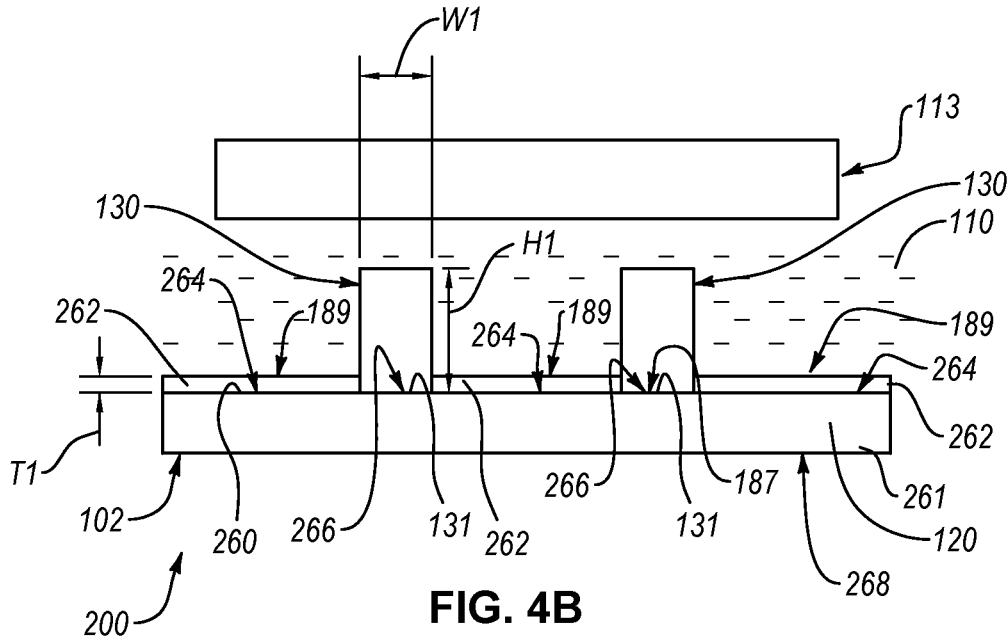
FIG. 4B is a schematic, side elevation view of material being deposited onto the cathode portion of FIG. 10A, according to one or more examples of the present disclosure.

Now referring to FIGS. 4A and 4B, according to some examples, the finished product 200 is an integrated circuit that includes a substrate, such as semiconductor-based wafer 268, and one or more of a pillar, via, or other thin-walled structure formed on the semiconductor-based wafer 268. The semiconductor-based wafer 268 can be made of a semiconductor material, such as, for example, Si (silicon), SiC (silicon carbide), GaN (gallium nitride), $MoS2$ (molybdenum disulfide), etc. The build plate 102 is the semiconductor-based wafer 268 and the material 130 deposited onto the build plate 102 forms the thin-walled structure. The process for making the integrated circuit of FIGS. 10A and 10B is described in more detail below.

Although the above examples are set forth to facilitate manufacture of a lead-frame package by forming wires on a build plate, it is recognized that the above examples can be applicable to the manufacture of any of various other types of devices that require wires or other electrically-conductive components for operation of the devices.

In view of the foregoing, according to some examples, the conductive surface 131 of the cathode portion 120 of the build plate 102 is patterned prior to positioning the conductive surface 131 into the electrolyte solution 110. Referring to FIGS. 2A-3B and 4A-4B, in some examples, the conductive surface 131 of the cathode portion 120 is patterned prior to positioning the conductive surface 131 of the cathode portion 120 into the electrolyte solution 110. As used herein, the conductive surface 131 is patterned when a surface of the cathode portion 120 of the build plate 102, configured to be positioned into the electrolyte solution 110 during an electrochemical additive manufacturing process, has multiple distinct areas where at least a first one of the distinct areas (e.g., areas 187) has material deposition characteristics that are different than the material deposition characteristics of at least a second one of the distinct areas (e.g., areas 189). As used herein, material deposition characteristics are characteristics of a material that affect the ability of a metallic material to be deposited onto the material via an electrochemical deposition process. For example, the composition of a material of the build plate 102, such as being one of a conductive or non-conductive material, affects whether metallic material is capable of being deposited onto the build plate 102 via an electrochemical deposition process. As another example, the elevations of a material, relative to the deposition anodes 111, can affect whether metallic material is capable of being deposited onto the build plate 102. In contrast, one example of a build plate 102 that is not patterned is a build plate where the conductive surface is defined exclusively by the flat planar surface of a base block of the build plate.

One example of a cathode portion 120, of a build plate 102, having a conductive surface 131 that is patterned prior to deposition of material onto the cathode portion 120 is shown in FIGS. 4A and 4B. The build plate 102 includes a base 261 made of a conductive material (e.g., a conductive base or a conductive layer on a non-conductive base). The base 261 defines a deposition surface 260, which is made of a conductive material. The build plate 102 further includes a photomask layer 262 applied onto only a portion of the deposition surface 260. The photomask layer 262 is made of a non-conductive, photomasking material, which can be patterned through techniques, such as, but not limited to, photolithography, stereolithography, inkjet deposition, imprint-based lithography, etc. Accordingly, the photomask layer 262 covers a portion of the deposition surface 260 and does not cover another portion of the deposition surface 260. The portion of the deposition surface 260 covered by the photomask layer 262 is defined as a covered portion 264. In contrast, the portion of the deposition surface 260 that is not covered by the photomask layer 162 is defined as an uncovered portion 266. Moreover, the uncovered portion 266 of the deposition surface 260 defines the conductive surface 131 of the cathode portion 120 of the build plate 102. Accordingly, although the entire base 261 can be considered the cathode portion 120 of the build plate 102, only the surface of the base 261 that is uncovered is considered the conductive surface 131 of the cathode portion 120. In this manner, the photomask layer 262, being patterned, helps to pattern the conductive surface 131 of the cathode portion 120. Additionally, with the photomask layer 162 in place, the build plate 102 has a surface that includes first distinct areas 187, defined by the conductive surfaces 131, and second distinct areas 189, defined by the surfaces of the photomask layer 162.

Referring to FIG. 4B, when electrical current flows through the deposition anode array 113 and the electrolyte solution 110, the material 130 is deposited onto only the uncovered portion 266 of the deposition surface 260 (i.e., the first distinct areas 187), because the uncovered portion 266 is an exposed conductive surface, and the material 130 is not deposited onto the covered portion 264 of the deposition surface 260 (corresponding with the second distinct areas 189), because the covered portion 264 is not exposed to the electrolyte solution 110. The material 130 can be added layer by layer to form a conductive feature on the build plate 102. In one example, as shown in FIG. 10B, the conductive feature is a pillar, via, or thin-walled structure having a high aspect ratio. A conductive feature having a high aspect ratio is a conductive feature that has a height H1 that is much greater than a width W1 (which can be a thickness) of the conductive feature. According to some examples, the height H1 is at least two times the width W1. However, in other examples, the height H1 is at least three times the width W1.

The use of the photomask layer 162 to help pattern the conductive surfaces 131 also facilitates the efficient deposition of the material 130 at a footing of the material such that conductive features with high aspect ratio can be formed without additional layers or a thicker layer of photomask. The photomask layer 162 not only defines the conductive surface 131 onto which the material 130 is deposited, but it also insulates the deposition surface 260 that adjoins the conductive surface 131 from secondary current. Accordingly, the material 130 forming a footing of the conductive feature on the conductive surface 131 is confined to the conductive surface 132 by the photomask layer 162. In this manner, excess material is prevented from being deposited around the footing of the conductive feature. After the footing is formed, additional layers of the material 130 can be deposited onto the footing to complete the conductive features. Therefore, a thickness TI of the photomask layer 162 can be much less than the height H1 of the conductive feature. After the footing is formed or, alternatively, after the conductive feature is fully formed, the photomask layer 162 can be chemically removed prior to use of the build plate 102 as a finished product 200.

The ability of the material 130 to be deposited onto a surface of the build plate 102 is at least partially dependent on the distance of the surface away from the deposition anode array 113. For example, if the distance is too far, the electrical current from the deposition anode array 113 and passing through the electrolyte solution 110 will not be sufficient to deposit the material 130 onto the surface. Accordingly, a distance a surface is away from the deposition anode array 113 is considered a material deposition characteristic of that surface.

For a build plate 102 that has a cathode portion 120 with a conductive surface 131 that is patterned prior to deposition of material onto the build plate 102, the controller 122 of the electrochemical deposition system 100 can include a position-registration module. The position-registration module is configured to register the position of the conductive surface 131 (e.g., material deposition targets on the conductive surface 131), relative to the build plate 102 and relative to the deposition anodes 111 of the deposition anode array 113. Registration of the position of the conductive surface 131 can be performed in advance of the manufacturing of the build plate 102 based on models and predictions. Additionally, or alternatively, registration of the position of the conductive surface 131 can be performed after the manufacturing of the build plate 102 based on scanning and/or measuring the build plate 102.

According to some examples, transmitting the electrical energy through the deposition anode 111 of block 406 of the method 400, and transmitting the electrical energy from the deposition anode 111 through the electrolyte solution 110, to the conductive surface 131 of the cathode portion 120 of the build plate 102 of block 408 of the method 400, includes selectively connecting the conductive layer of the build plate 102 to the electrical power source 119. With the electrical power source 119 electrically connected to the deposition anode array 113, selectively connecting the conductive layer of the build plate 102 to the electrical power source 119 causes the electrical energy to transmit through the deposition anode 111 and from the deposition anode 111 to the conductive surface 131 of the cathode portion 120. In other words, selectively connecting the conductive layer of the build plate 102 to the electrical power source 119 closes the electrical circuit between the deposition anode array 113 and the conductive layer so that the material 130 can be deposited onto the conductive layer. In some examples, where the conductive layer includes multiple conductive-layer segments, which are electrically isolated from each other, the method 400 can include separately and independently selectively connecting each one of the plurality of conductive-layer segments to cause the electrical energy to transmit through corresponding ones of the plurality of deposition anodes 111 and from the corresponding ones of the plurality of deposition anodes 111 to corresponding ones of the plurality of conductive-layer segments such that the material 130 is deposited onto the corresponding ones of the plurality of conductive-layer segments.

Selectively connecting the conductive layer or conductive-layer segments can be facilitated by cathode deposition control circuits 117. The cathode deposition control circuits 117 are electrically connected to a negative terminal of the electrical power source 119 and are selectively operable to electrically connect the negative terminal of the electrical power source 119 to the conductive layer to initiate the flow of electrical current from the deposition anode array 113 to the cathode portion 120 of the build plate 102.

In some example, the positive terminal of the electrical power source 119 is non-selectively electrically connected to the deposition anode array 113, such that the flow of electrical current from the deposition anode array 113 to the cathode portion 120 of the build plate 102 is controlled exclusively by the cathode deposition control circuits 117 and selective electrical connection between the conductive layer and the negative terminal of the electrical power source 119. However, in other examples, the positive terminal of the electrical power source 119 is selectively electrically connected to the deposition anode array 113, such as via selective operation of the deposition control circuits 115. In these examples, when both the conductive layer of the build plate 102 and the deposition anode array 113 are selectively connected to the electrical power source 119, the electrical energy is transmitted through one or more of the deposition anodes 111 of the deposition anode array 113 and from the deposition anodes 111 to the conductive layer of the build plate 102.

According to some examples, the spacing between adjacent conductive-layer segments corresponds with the size of each one of deposition anodes 111 of the deposition anode array 113. For example, the spacing between adjacent conductive-layer segments can be equal to the width of a deposition anode 111. However, as presented above, the electrochemical deposition process of the present disclosure enables the material 130 to be deposited in a lateral direction, to form overhang portions of the material 130. In this manner, spacing between conductive-layer segments can be less than a width of a deposition anode 111 by forming one or more overhang portions between the conductive-layer segments.

The deposition anodes 111 of the deposition anode array 113 are selectively activated according to the location of the deposition anodes 111 relative to the conductive-layer segments. For example, only those of the deposition anodes 111 that align with (e.g., are vertically offset from) or form the same predetermined pattern as the conductive-layer segments are activated. In other words, the deposition anodes 111 that are selectively activated form a pattern matching the pattern of the conductive-layer segments. This ensures the material 130 is deposited onto the conductive-layer segments in a precise and efficient manner. In some examples, the predetermined pattern of conductive-layer segments is uploaded to or accessed by the controller 122, which controls activation of the deposition anodes 111 accordingly. However, in certain examples, the predetermined pattern is not uploaded or accessed by the controller 122 prior to depositing the material 130, such as when the predetermined pattern is not known in advance. In these examples, the sensors 123 of the electrochemical deposition system 100 includes one or more sensors that senses the pattern of conductive-layer segments. Then, in response to a sensed pattern of conductive-layer segments received by the one or more sensors, the controller 122 controls activation of the deposition anodes 111.

In some examples, the conductive layer can be patterned, to create conductive-layer segments having patterns similar to those described herein, by utilizing a patterned mask. The patterned mask can be applied onto an electrically conductive base, which acts as the conductive layer of the build plate 102. Moreover, the patterned mask includes through-apertures patterned according to a desired pattern of conductive-layer segments. The patterned mask is made of an electrically non-conductive material so that when electrical energy is transmitted through the deposition anode array 113, through the electrolyte solution 110, and to the conductive layer, the material 130 is electrochemically deposited onto only the portions of the conductive layer exposed by the through-apertures. In this manner, the material 130 deposited onto the conductive layer forms a pattern corresponding with the pattern defined by the through-apertures.

The electrochemical deposition system 100 and associated method of using the system to make a finished product can help simplify the fabrication of a finished product that includes an electrically-conductive base with one or more electrically-conductive elements on the electrically-conductive base, where the electrically-conductive base is substantially larger than the one or more electrically-conductive elements. According to conventional methods, the electrically-conductive base is electrochemically deposited onto a conductive surface and then the one or more electrically-conductive elements are electrochemically deposited onto the base. To simplify the process, the electrically-conductive base can be formed in a separate process, other than an electrochemical deposition process, and supplied to the electrochemical deposition system 100 as the build plate 102. The electrochemical deposition system 100 then electrochemically deposits material onto the separately and previously formed electrically-conductive base.

It is also recognized that the fabrication of the finished products 200 using the electrochemical deposition system 100 can incorporate one or more additional components to form a resulting circuit. The resulting circuit can be tested after the finished product is completed or while the finished product is being fabricated.

Other features and steps of the electrochemical deposition system 100 and the method 400, respectively, can be found in U.S. patent application Ser. No. 17/112,909, filed December 2020, which is incorporated herein by reference in its entirety.

Figures 5A, 5B, 5C:
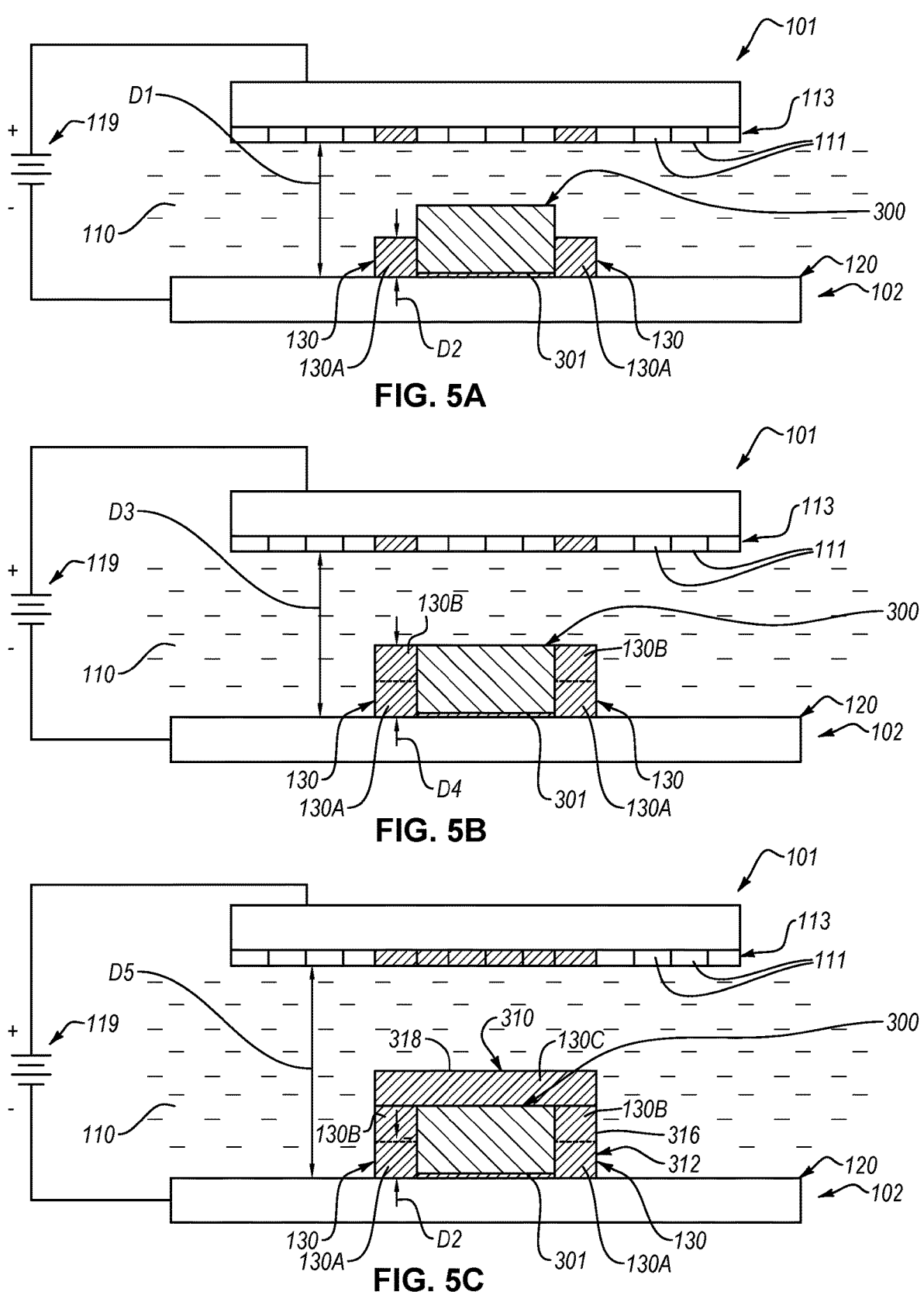
FIG. 5A is a schematic, partial sectional, side elevation view of material being deposited onto a cathode portion of a build plate around a first electronic device using the system of FIG. 1, according to one or more examples of the present disclosure.
FIG. 5B is a schematic, partial sectional, side elevation view of additional material being deposited onto the cathode portion of FIG. 5A, according to one or more examples of the present disclosure.
FIG. 5C is a schematic, partial sectional, side elevation view of yet additional material being deposited onto the cathode portion of FIG. 5A, according to one or more examples of the present disclosure.

Referring to another example, as shown in FIG. 13, an electrochemical additive manufacturing method 500 includes (block 502) coupling a first electronic device, such as first electronic device 300 (see, e.g., FIG. 5A) to the build plate 102. The electrochemical additive manufacturing method 500 also includes (block 504) positioning the build plate 102 into the electrolyte solution 110 such that the cathode portion 120 of the build plate 102 directly contacts the electrolyte solution 110. The electrochemical additive manufacturing method 500 additionally includes (block 506) positioning the deposition anode array 113, which includes the plurality of deposition anodes 111, into the electrolyte solution 110 such that a gap is established between the cathode portion 120 and the deposition anode array 113. The electrochemical additive manufacturing method 500 further includes (block 508) connecting the cathode portion 120 of the build plate 102 to the electrical power source 119, and (block 510) connecting one or more deposition anodes of the plurality of deposition anodes 111 to the electrical power source 119. The electrochemical additive manufacturing method 500 also includes (block 512) transmitting electrical energy from the electrical power source 119, through the one or more deposition anodes 111, through the electrolyte solution 110, and to the cathode portion 120 of the build plate 102, such that material 130 is deposited onto the cathode portion 120 and forms at least a sidewall of a shell (e.g., a sidewall 326 of a shell 312, as shown in FIG. 5C) that encases the first electronic device against the build plate 102 when the first electronic device 300 is coupled to the build plate 102. The shell and the first electronic device 300 form a second electronic device, such as a second electrical device 310 of FIG. 5D.

In some examples, as shown in FIGS. 5A-5C, the first electronic device 300 is coupled to the build plate 102 before the material 130 is deposited onto the cathode portion 120 of the build plate 102. In certain examples, the first electronic device 300 is attached to the build plate 102 using one or more attachment techniques. According to one example, which is illustrated in FIG. 5A, the first electronic device 300 is adhered to the build plate 102 via an adhesive 301. The adhesive 301 is a temporary adhesive, in some implementations, and a permanent adhesive, in other implementations. In one example, the adhesive 301 is a glue that is hardenable (e.g., curable) from a pliable state to a hardened state. In such an example, the adhesive 301 is applied to the first electronic device 300 or the build plate 102 in the pliable state, and the first electronic device 300 is attached to the build plate 102 (so that the adhesive 301 is sandwiched between the first electronic device 300 and the build plate 102) with the adhesive 301 still in the pliable state. Then, the electrochemical additive manufacturing method 500 can further include hardening (e.g., setting or curing) the adhesive 301 to firmly secure the first electronic device 300 to the build plate 102. The step of hardening the adhesive 301 can be done passively, without external devices, or actively, with external devices, such as heaters for applying heat to the adhesive 301 or fans for circulating air past the adhesive 301. According to one example, the adhesive 301 is a solder paste. In addition, or as an alternative, to using an adhesive 301, according to certain examples, attachment of the first electronic device 300 to the build plate 102 is accomplished by welding the first electronic device 300 to the build plate 102. In any of the above examples, the first electronic device 300 can be attached to the cathode portion 120 of the build plate 102, or to a portion or portions of the build plate 102 adjacent the cathode portion 120.

Referring to FIG. 5A, after the first electronic device 300 is coupled to the build plate 102, electrical energy is transmitted through one or more of the deposition anodes 111 to deposit the material 130 onto the cathode portion 120. The material 130 is deposited onto the cathode portion 120 so that the material 130 forms at least a sidewall 326 of a shell 312. The sidewall 326 encases the first electronic device 300. In FIG. 5A, a first layer 130A of the material 130 forms a first layer of the sidewall 326. The first layer 130A of the material 130 is deposited onto the cathode portion 120 when the gap between the cathode portion 120 and the deposition anode array 113 of the printhead 101 is a first distance D1.

The thickness of the first layer 130A is equal to a second distance D2. In some examples, the second distance D2 is equal to or greater than a height of the first electronic device 300. In other examples, as shown, the second distance D2 is less than the height of the first electronic device 300. When the second distance D2 is less than the height of the first electronic device 300, one or more additional layers of the material 130 can be deposited onto the first layer 130A. For example, as shown in FIG. 5B, one or both of the build plate 102 and the deposition anode array 113 is moved, so that the gap between them is a third distance D3 (equal to the sum of the first distance D1 and the second distance D2), and a second layer 130B of the material 130 is deposited onto the first layer 130A. When the first electronic device 300 has a constant cross-sectional shape, the same deposition anodes 111 activated to deposit the first layer 130A can be reactivated to deposit the second layer 130B. When the first electronic device 300 has a variable cross-sectional shape, a different set of deposition anodes 111, corresponding with the shape of the first electronic device 300 where the second layer 130B is to be deposited, can be activated to deposit the second layer 130B. A representation of the deposition anodes 111 activated during a deposition process are those deposition anodes 111 that are shaded in the figures. The transmission of electrical energy through the deposition anodes 111 is repeated until the entire sidewall 326 of the shell 312 is formed, which, in some examples, has a height equal to the height of the first electronic device 300.

After the sidewall 326 is formed, the shell 312 is completed by forming a top 318 (e.g., top layer) of the shell 312, thus embedding the first electronic device 300 in the shell 312 and encasing (e.g., enclosing or encapsulating) the first electronic device 300 against the build plate 102. Referring to FIG. 5C, this can be accomplished by moving one or both of the build plate 102 and the deposition anode array 113, so that the gap between them is a fifth distance D5 (equal to the sum of the third distance D3 and a fourth distance D4), and applying at least one additional layer (e.g., a third layer 130C) onto the sidewall 326 of the shell 312 and onto a top of the first electronic device 300. In some examples, a portion of the material 130 forming the top 318 of the shell 312 is formed as an overhang relative to the sidewall 326. In the example of FIGS. 5A-5C, the material 130 deposited by, in part, transmitting electrical energy through the deposition anodes 111 forms an entirety of the shell 312.

Figure 8:
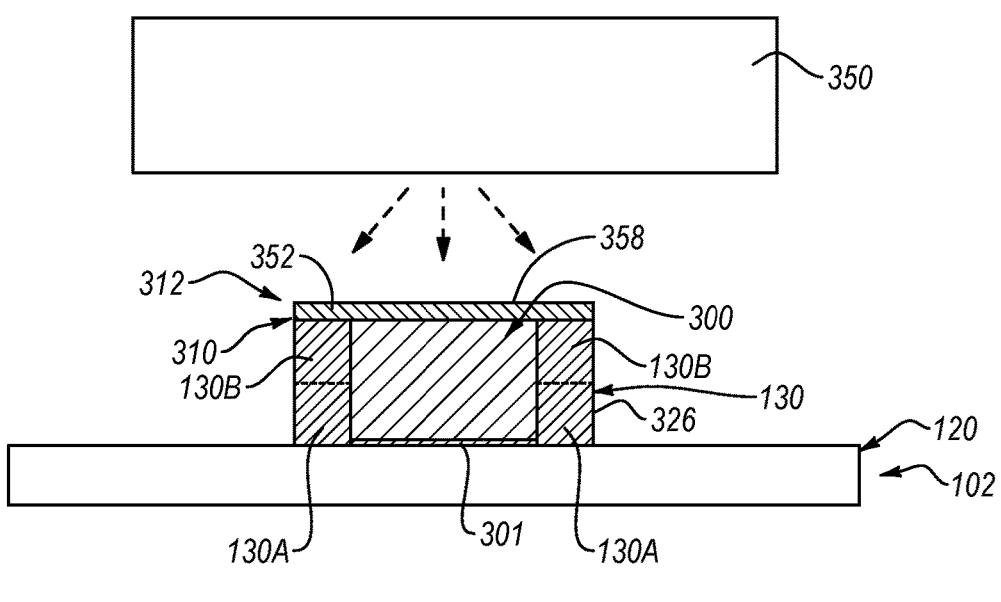
FIG. 8 is a schematic, partial sectional, side elevation view of material being deposited onto a first electronic device using a secondary material deposition system, according to one or more examples of the present disclosure.

In an alternative example, as shown in FIG. 8, after the sidewall 326 is formed, the shell 312 is completed by forming a top 358 (e.g., top layer) of the shell 312 using a material deposition technique different from that used for the sidewall 326. In the illustrated example, a material deposition apparatus 350 can be used to deposit or apply a second material 352 onto the sidewall 326 and onto a top of the first electronic device 300. The second material 352 forms the top 358 of the shell 312. In some examples, the second material 352 is different than the material 130. According to certain examples, the material deposition apparatus 350 is a material sputtering apparatus that sputters the second material 352 onto the sidewall 326 and onto a top of the first electronic device 300. In another example, the material deposition apparatus 350 is a material plating apparatus (e.g., an electro-less plating apparatus) that plates the second material 352 onto the sidewall 326 and onto a top of the first electronic device 300.

The position of the shell 312 on the cathode portion 120 corresponds with the location of the deposition anodes 111 through which the electrical energy is transferred. In other words, the size, shape, and location of the pattern of deposition anodes 111 through which the electrical energy is transferred corresponds with the size, shape, and location of the material 130 deposited onto the cathode portion 120. Accordingly, as shown, the pattern of deposition anodes 111 that are activated to form each layer of the sidewall 326 of the shell 312 is different from the pattern of the deposition anodes 111 that are activated to form the top 318 of the shell 312.

Figure 10:
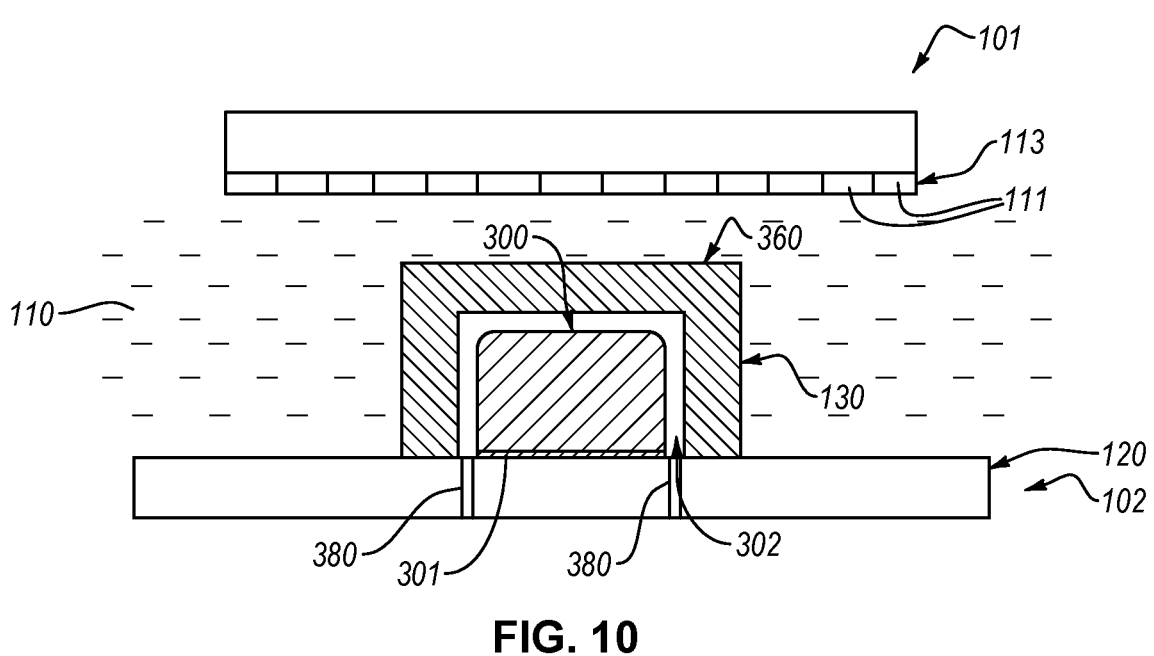
FIG. 10 is a schematic, partial sectional, side elevation view of material deposited onto a cathode portion of a build plate around a first electronic device using the system of FIG. 1, according to one or more examples of the present disclosure.

In some examples, the layers of the material 130 forming the sidewall 326 (e.g., the first layer 130A and the second layer 130B) and the top (e.g., the top 318) of the shell 312 are deposited so that the layers are in direct contact with the first electronic device 300. Depositing the material 130 in direct contact with the first electronic device 300 facilitates secure retention of the first electronic device 300 by the shell 312, a smaller form factor, and/or improved heat transfer to or from the first electronic device 300. In other examples, as shown in FIG. 10, the material 130 is deposited around the first electronic device 300 so that a gap 362 is defined between at least a portion of a shell 360 formed by the material 130 and the first electronic device 300. The gap 362 helps facilitate insulation of the first electronic device 300. In certain examples, weep holes 380 are formed in the build plate 102 at locations that correspond with the gap 362. The weep holes 380 are utilized to drain electrolyte solution 110 in the gap 362 after the shell 360 is formed. Additionally, the weep holes 380 can be used to inject insulation material, such as foam, fibers, fluids, gasses, and the like, into the gap 362.

In some examples, the shell 312 has a shape that corresponds with the shape of the first electronic device 300. Moreover, the first electronic device 300 is embedded in the shell 312 and the shell 312 encases (e.g., encloses or encapsulates) the first electronic device 300 against the build plate 102 so that at least a portion of the first electronic device 300 is located in an enclosed cavity defined between the shell 312 and the build plate 102. The first electronic device 300 can have any of various shapes each having any of various cross-sectional shapes or variously shaped outer peripheries. Because the shell 312 encases the first electronic device 300, each layer of the sidewall 326 of the shell 312 forms a continuous shape (e.g., ring) that surrounds the outer periphery of the first electronic device 300. Accordingly, it is to be understood that FIGS. 5A-5C merely show a cross-section of the layer or layers of the sidewall 326 and that the layer or layers extend into, out of, and along the page to form a continuous shape around the first electronic device 300. Similarly, the layer or layers of the top 318 of the shell 312 extend into, out of, and along the page to couple with the sidewall 326 and cover the first electronic device 300.

Figure 5D:
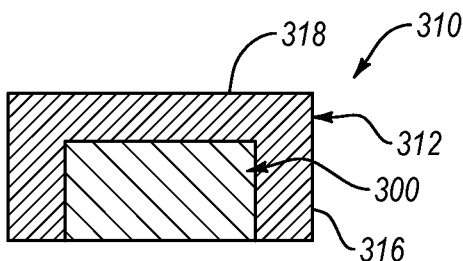
FIG. 5D is a schematic, sectional, side elevation view of a second electronic device that includes the first electronic device and the material deposited onto the cathode portion of FIG. 5A, according to one or more examples of the present disclosure.

After the shell 312 is deposited, the shell 312 and the first electronic device 300 form a second electronic device 310 (see, e.g., FIGS. 5C and 5D). According to certain examples, the second electronic device 310 provides functionality that is the same as or similar to that of the first electronic device 310, with the shell 312 of the second electronic device 310 providing protection, insulation, or electrically connectivity for the first electronic device 300. In some examples, as shown in FIG. 5D, the second electronic device 310 does not include all or a portion of the build plate 102 and is removed from the build plate 102. Removal from the build plate 102 is performed by pulling, or otherwise detaching, the second electronic device 310 away from the build plate 102 with a force greater than the adhesion strength of the adhesive 301 and the coupling between the material 130 and the build plate 102. In some examples, the adhesion strength of the adhesive 301 and/or the coupling between the material 130 and the build plate 102 can be reduced (e.g., via heat treatment, chemical treatment, etc.) to facilitate removal of the second electronic device 310. Although not shown, in certain examples, at least a portion of the build plate 102 forms part of the second electronic device 310 such that the shell 312 and the first electronic device 300 are not removed from the build plate 102 to form the second electronic device 310.

Figures 6A, 6B, 6C:
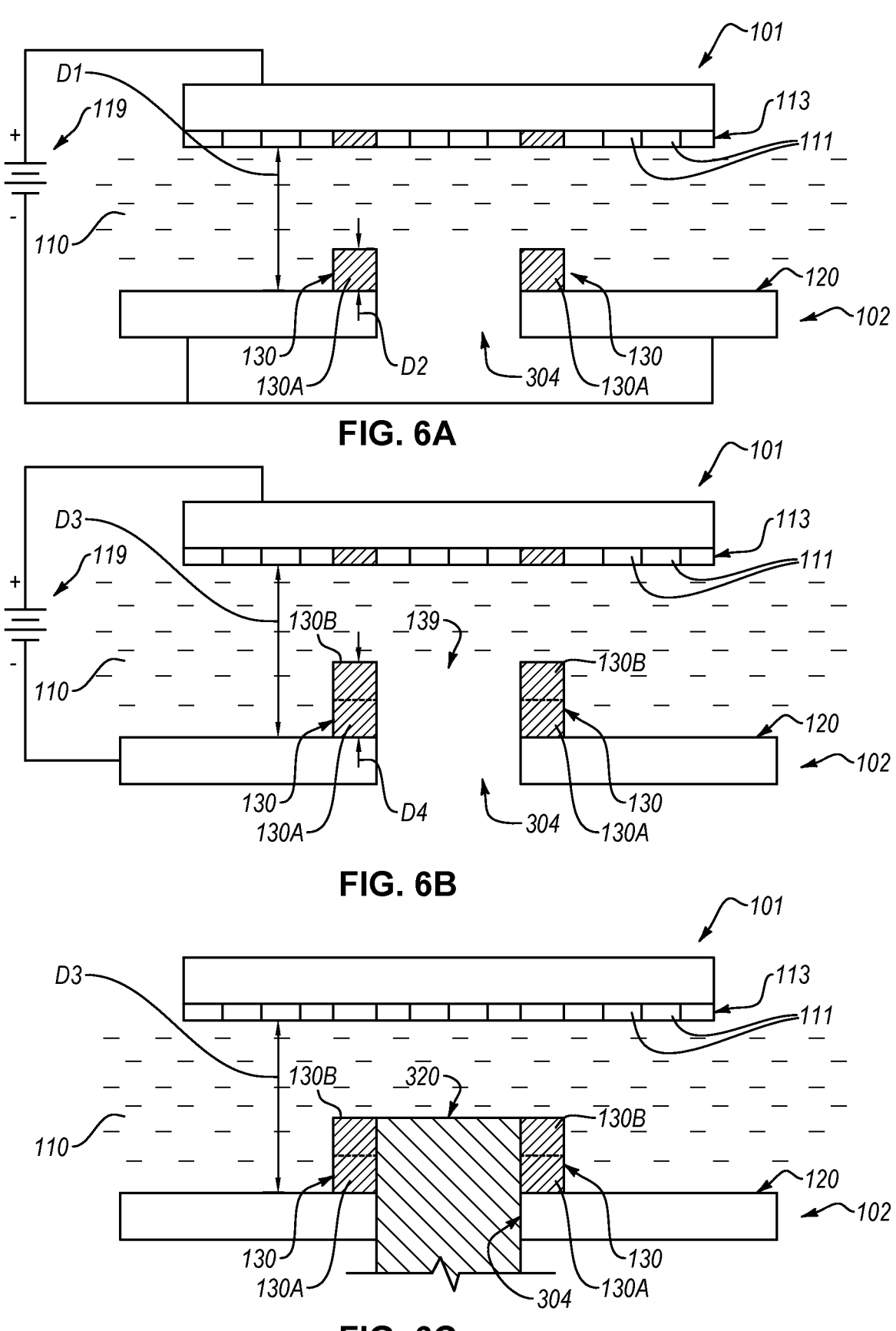
FIG. 6A is a schematic, partial sectional, side elevation view of material being deposited onto a cathode portion of a build plate using the system of FIG. 1, according to one or more examples of the present disclosure.
FIG. 6B is a schematic, partial sectional, side elevation view of additional material being deposited onto the cathode portion of FIG. 6A, according to one or more examples of the present disclosure.
FIG. 6C is a schematic, partial sectional, side elevation view of yet additional material being deposited onto the cathode portion of FIG. 6A, according to one or more examples of the present disclosure.
Figure 11:
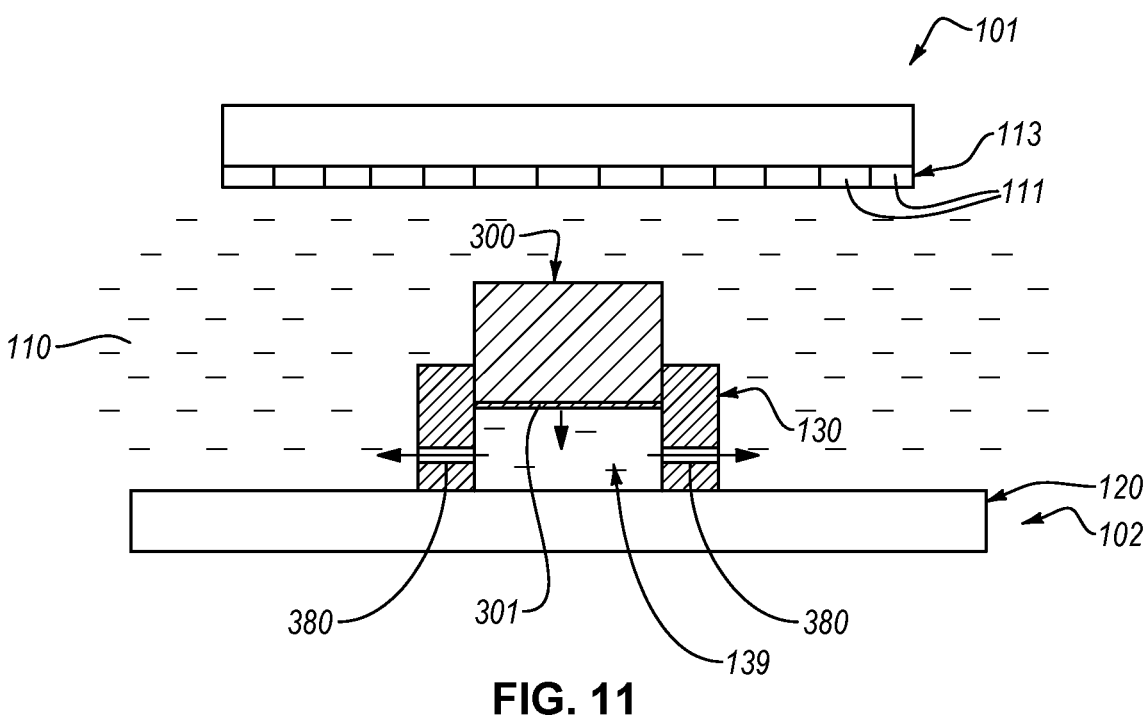
FIG. 11 is a schematic, partial sectional, side elevation view of a first electronic device being inserted into a receptacle formed by material deposited onto a cathode portion of a build plate around a first electronic device using the system of FIG. 1, according to one or more examples of the present disclosure.

In contrast to the examples shown in FIGS. 5A-5C, and according to the examples shown in FIGS. 6A-6E, a first electronic device 320 is coupled to the build plate 102 after at least a portion of the material 130 is deposited onto the cathode portion 120 of the build plate 102. In other words, the process for depositing the material 130 onto the cathode portion 120 for the examples shown in FIGS. 5A-6E is the same or similar, but the timing for depositing the material 130, relative to the coupling of the first electronic device to the build plate 102, in the respective examples shown in FIGS. 5A-5D and FIGS. 6A-6E is different. Referring to FIG. 6A, the first layer 130A of the material 130 is deposited onto the cathode portion 120 before the first electronic device 320 is coupled to the build plate 102. Similarly, before the first electronic device 320 is coupled to the build plate 102, a second layer 130B of the material 130 is deposited onto the cathode portion 120. The material 130 deposited onto the cathode portion 120 defines a receptacle 139 that is configured to receive and at least partially retain the first electronic device 320. As shown in FIG. 6C, the first electronic device 320 is inserted into and is at least partially retained by the receptacle 139. In some examples, the receptacle 139 is sized and shaped such that receptacle 139 maintains a fixed fit (e.g., an interference fit, a transition fit, etc.) with the first electronic device 320. In some examples, an adhesive is used to help retain the first electronic device 320 in the receptacle 139. The receptacle 139 can be a through-hole, as shown in FIGS. 6B and 11, or a blind hole, where the material 130 is deposited onto the cathode portion 120 between a sidewall 326 of a shell 324 so as to form a bottom of the shell 324.

Figure 6D:
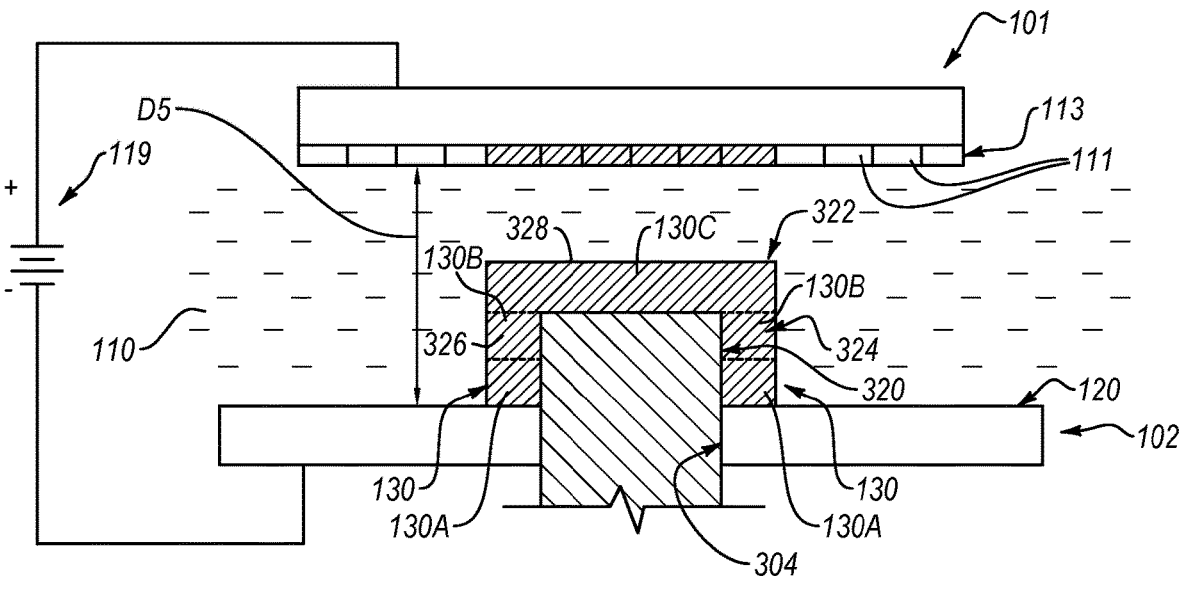
FIG. 6D is a schematic, partial sectional, side elevation view of material deposited onto a first electronic device coupled to the build plate of FIG. 6A, according to one or more examples of the present disclosure.
Figure 6E:
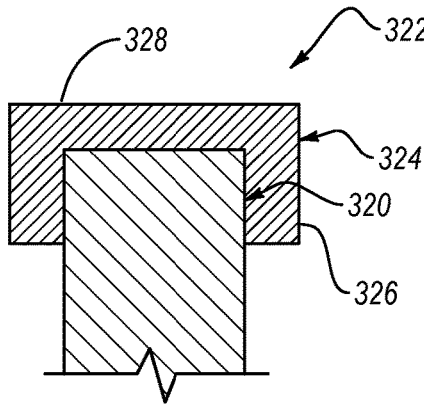
FIG. 6E is a schematic, sectional, side elevation view of a second electronic device that includes the first electronic device and the material deposited onto the cathode portion and the first electronic device, according to one or more examples of the present disclosure.

Referring to FIG. 6D, after the first electronic device 300 is inserted into the receptacle 139, a top 328 of the shell 324 is formed by depositing additional portions of the material 130 onto the sidewall 326 and onto the top of the first electronic device 320. After the shell 324 is deposited, the shell 324 and the first electronic device 320 form a second electronic device 322 (see, e.g., FIG. 6D), which can be removed from the build plate 102, as shown in FIG. 6E, or kept fixed to the build plate 102.

According to some examples, the build plate 102 includes an aperture 304 that helps facilitate the insertion and retention of the first electronic device 320 in the receptacle 139 formed by the material 130. In the illustrated examples, the aperture 304 is a through hole, which enables insertion of the first electronic device 320 into the receptacle 139 by first passing the first electronic device 320 through the build plate 102 (e.g., from underneath the build plate 102). Additionally, the aperture 304 of the build plate 102 can be configured to at least partially retain the first electronic device 320 in place, such as with a fixed fit, while the top 328 of the shell 324 is formed. Furthermore, the aperture 304 of the build plate 102, when configured as a through hole, accommodates various sizes of the first electronic device 320 by allowing a portion of the first electronic device 320 to protrude beneath the build plate 102 away from the deposition anodes 111 and the electrolyte solution 110. When configured as a through hole, the aperture 304 of the build plate 102 also provides an outlet through which portions of the electrolyte solution 110 in the receptacle 139 can be evacuated from the receptacle 139 as the first electronic device 320 is inserted into the receptacle 139. In alternative examples, the aperture 304 of the build plate 102 is a blind hole or a recess formed in a surface of the build plate 102, facing the deposition anode array 113, and the first electronic device 320 is seated in the blind hole or the recess without passing entirely through the build plate 102.

Figure 7A:
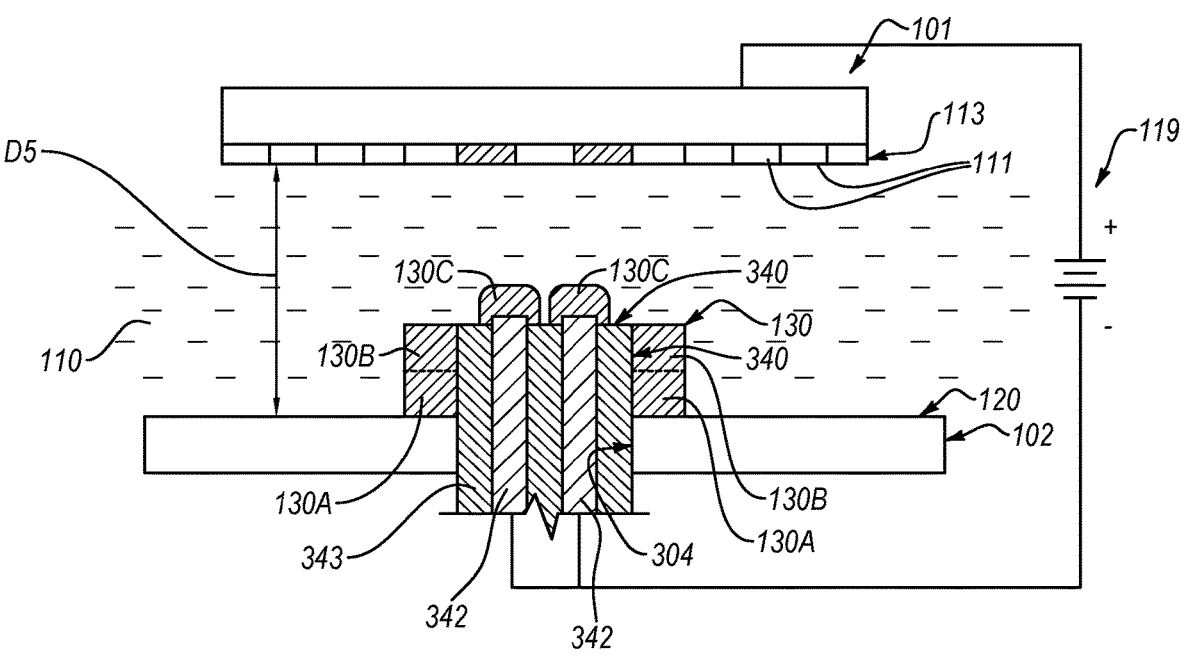
FIG. 7A is a schematic, partial sectional, side elevation view of material being deposited onto a cathode portion of a build plate and onto an electrically conductive portion of a first electronic device using the system of FIG. 1, according to one or more examples of the present disclosure.
Figure 7B:
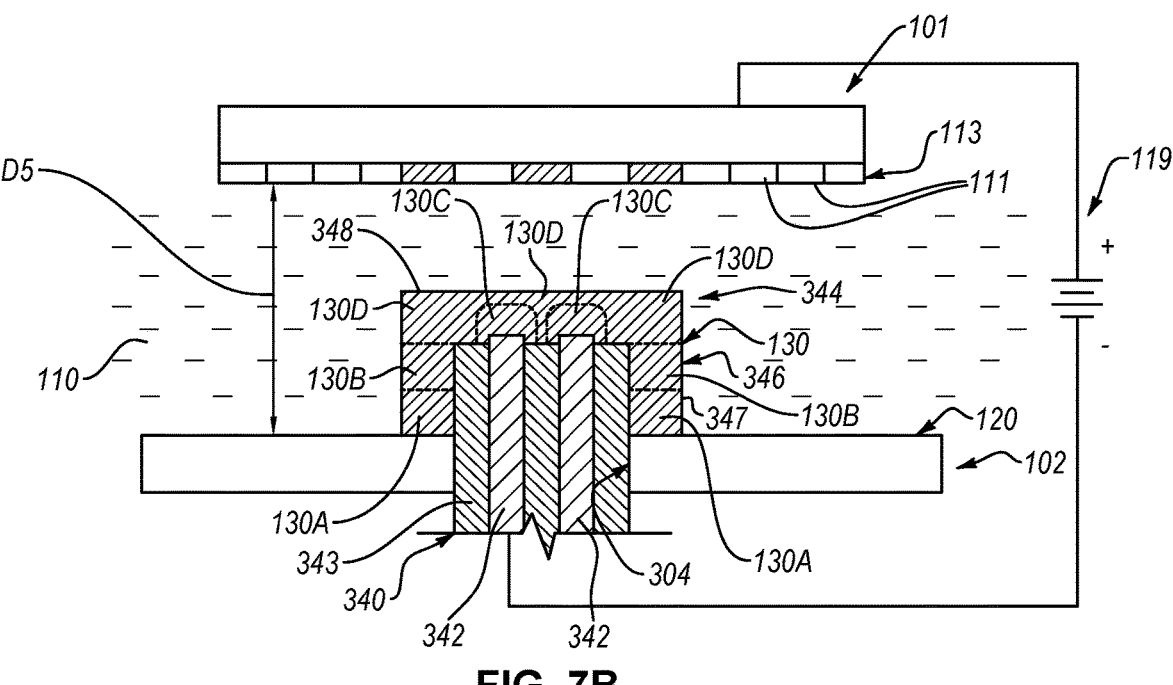
FIG. 7B is a schematic, partial sectional, side elevation view of material being deposited onto the first electronic device of FIG. 7A, according to one or more examples of the present disclosure.

According to some examples, as shown in FIGS. 7A and 7B, electrically conductive portions of the first electronic device can be utilized to help form the shell over the first electronic device. Referring to FIG. 7A, a first electronic device 340 includes electrically conductive portions 342. The electrically conductive portions 342 can be electrically isolated from each other or electrically coupled together. The first electronic device 340 additionally includes an electrically non-conductive portion 343 (e.g., a body) that helps retain the electrically conductive portions 342. Although two electrically conductive portions 342 are shown, the first electronic device 340 can include one, two, or more than two electrically conductive portions 342. Each one of the electrically conductive portions 342 is a wire (e.g., a copper wire) in some examples. Part of each one of the electrically conductive portions 342 is exposed (e.g., not covered by the electrically non-conductive portion 343). In certain examples, two or more electrically conductive portions 342 are permanently electrically connected (e.g., by soldering) or temporarily electrically connected (e.g., by twisting together) prior to some or all of the processing steps described herein.

According to one example, as shown in FIG. 7A, the first electronic device 340 can be coupled to the build plate 102 (e.g., inserted into an aperture 304 of the build plate 102) and at least partially retained by the material 130 previously deposited onto the cathode portion 120, so that the exposed parts of the electrically conductive portions 342 are in direct contact with the electrolyte solution 110. In some examples, the electrically conductive portions 342 protrude into the electrolyte solution 110 beyond the material 130 that was previously deposited. However, in other examples, the electrically conductive portions 342 are flush with or recessed relative to the material 130 that was previously deposited. The electrically conductive portions 342 are then connected to the electrical power source 119, such as by connecting the electrically conductive portions 342 to the electrical ground of the build plate 102.

Referring again to FIG. 7A, with the electrically conductive portions 342 connected to the electrical power source 119, electrical energy is transmitted from the electrical power source 119, through at least one deposition anode 111, through the electrolyte solution 110, and to the electrically conductive portions 342, which results in material 130 being deposited onto the electrically conductive portions 342 as a layer 130C. The material 130 deposited on the electrically conductive portions 342 forms at least a portion of a top 348 of a shell 346 encasing the first electronic device 340. In certain examples, the material 130 deposited onto the electrically conductive portions 342 forms only a portion of the top 348, and, as shown in FIG. 7B, the remaining portion or portions of the top 348 of the shell 346 are formed by reconnecting the build plate 102 to the electrical power source 119, and activating one or more of the deposition anodes 111 to deposit another layer 130D onto a sidewall 347 of the shell 346 and onto any portions of the first electronic device 340 not covered by the material 130 deposited onto the electrically conductive portions 342. The first electronic device 340 and the shell 346, which form a second electronic device 344, can be removed from the build plate 102 or can remain attached to the build plate 102, with the build plate forming part of the second electronic device 344.

In the example illustrated in FIGS. 7A and 7B, the electrically conductive portions 342 of the first electronic device 340 are initially not electrically coupled together prior to depositing the material 130 onto the first electronic device 340. In such examples, the material 130 deposited onto the first electronic device 340 provides the electrical connection between the electrically conductive portion 342. In other words, the material 130, electrically coupling together the electrically conductive portions 342, effectively forms an electrical node between them. In some examples, the first electronic device 340 is an unfinished thermocouple (i.e., a thermocouple where the electrical wires are not electrically connected). A first one of the electrically conductive portions 342 of the unfinished thermocouple is made of a first metallic material, having a first thermal conductivity, and a second one of the electrically conductive portions 342 is made of a second metallic material, having a second thermal conductivity, which is different than the first thermal conductivity. When a temperature of a measured object or substance changes, the difference between the first and second thermal conductivities of the electrically conductive portions 342 induces an electric current at the electrical node, which can be measured and utilized to determine a temperature of the measured object or substance. Accordingly, a portion of the material 130 finishes the thermocouple. The remaining portion of the material 130, which forms the shell 346, enables the second electronic device 344 to function as a calorimeter. Therefore, in one example, the first electronic device 340 is an unfinished thermocouple and the second electronic device 344 is a calorimeter.

Figure 7C:
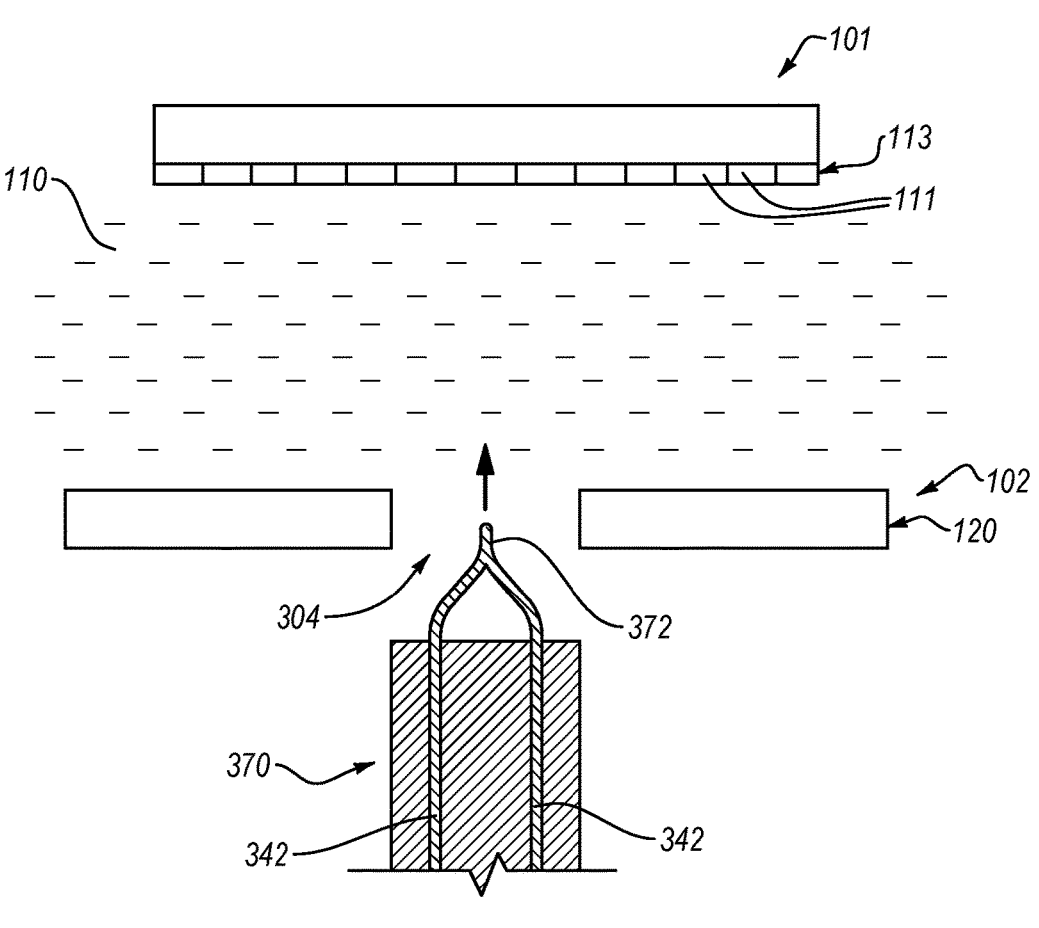
FIG. 7C is a schematic, partial sectional, side elevation view of a first electronic device being coupled to a build plate, according to one or more examples of the present disclosure.
Figure 7D:
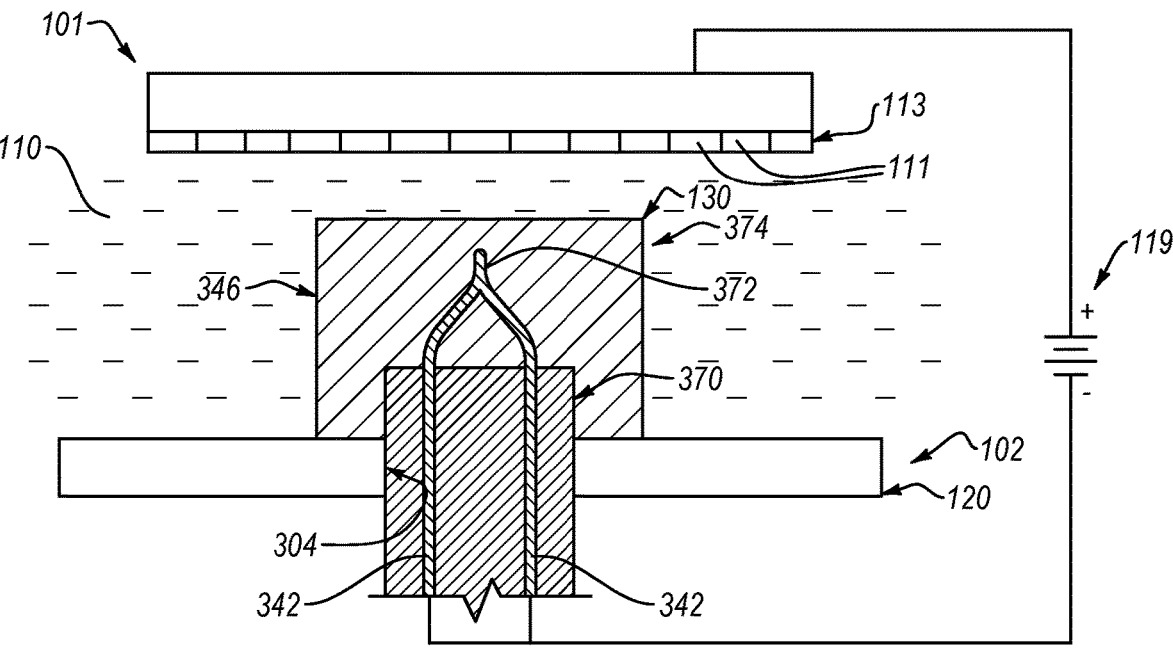
FIG. 7D is a schematic, partial sectional, side elevation view of material deposited onto the first electronic device of FIG. 7C, according to one or more examples of the present disclosure.

Referring to FIG. 7C, in some examples, the first electronic device 370 is a finished thermocouple. In other words, before the first electronic device 370 is coupled to the build plate 102, the electrically conductive portions 342 are permanently electrically coupled together to define an electrical node 372 between the electrically conductive portions 342. In one example, the electrically conductive portions 342 are permanently electrically coupled together by soldering them together, such that the soldered portions of the electrically conductive portions 342 form the electrical node 372. As shown in FIG. 7D, after the first electronic device 370 is coupled to the build plate 102, the material 130 is deposited over the first electronic device 370, including the electrical node 372, to form the shell 346, which enables the second electronic device 374 to function as a calorimeter. Therefore, in one example, the first electronic device 370 is a finished thermocouple and the second electronic device 374 is a calorimeter.

Figure 7E:
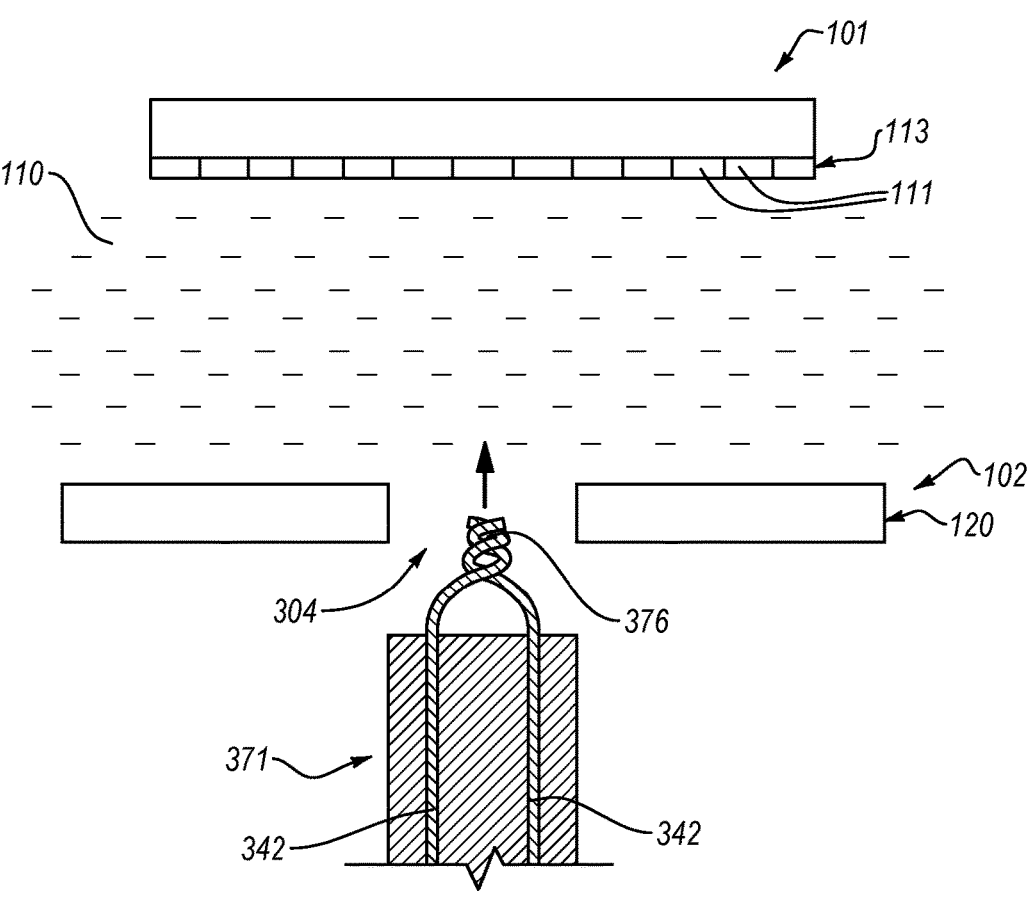
FIG. 7E is a schematic, partial sectional, side elevation view of a first electronic device being coupled to a build plate, according to one or more examples of the present disclosure.
Figure 7F:
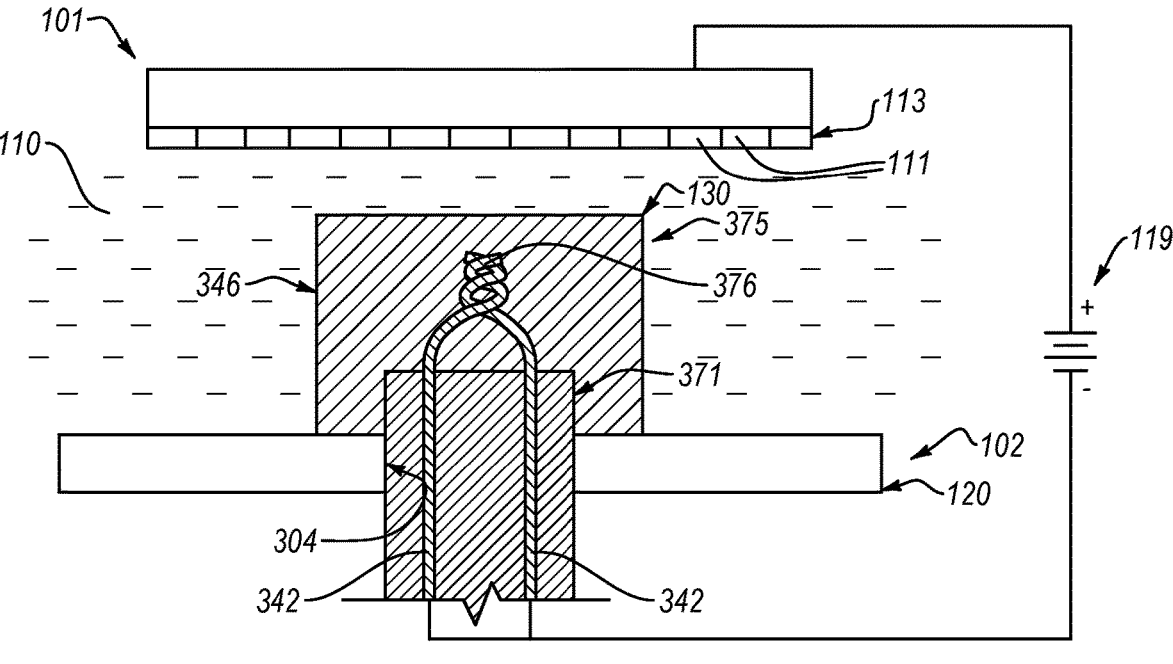
FIG. 7F is a schematic, partial sectional, side elevation view of material deposited onto the first electronic device of FIG. 7E, according to one or more examples of the present disclosure.

Referring to FIG. 7E, in some examples, the first electronic device 371 is a semi-finished thermocouple. In other words, before the first electronic device 371 is coupled to the build plate 102, the electrically conductive portions 342 are temporarily electrically coupled together to define a temporary electrical node 376 between the electrically conductive portions 342. In one example, the electrically conductive portions 342 are temporarily electrically coupled together by twisting their ends together, such that the twisted portions of the electrically conductive portions 342 form the temporary electrical node 376. As shown in FIG. 7F, after the first electronic device 371 is coupled to the build plate 102, the material 130 is deposited over the first electronic device 371, including the temporary electrical node 376, to form the shell 346, which enables the second electronic device 375 to function as a calorimeter. Therefore, in one example, the first electronic device 371 is a semi-finished thermocouple and the second electronic device 375 is a calorimeter.

Figure 9:
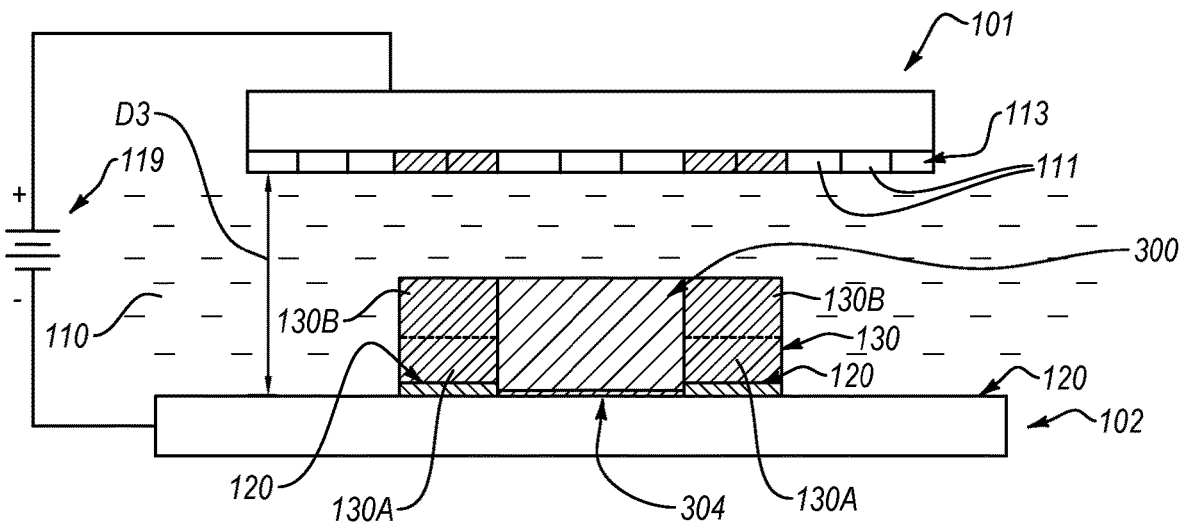
FIG. 9 is a schematic, partial sectional, side elevation view of material being deposited onto a cathode portion of a build plate around a first electronic device using the system of FIG. 1, according to one or more examples of the present disclosure.

Referring to FIG. 9, in some examples, the build plate 102 includes a substrate 190 made of or including an electrically non-conductive material or a semiconductor material. The cathode portion 120 of the build plate 102 is fixed to the substrate 190. For example, the cathode portion 120 can include one or more electrically conductive segments on the substrate 190. In certain examples, the build plate 102 is a printed circuit board or a semiconductor die. When electrical energy is transmitted from the electrical power source 119, through at least one deposition anode 111, through the electrolyte solution 110, and to the electrically conductive segments forming the cathode portion 120, the material 130 is deposited onto the electrically conductive segments and no material 130 is deposited onto the substrate 190.

Referring to FIG. 11, according to some examples, instead of, or in addition to, forming weep holes 380 in the build plate 102, weep holes 380 can be formed in the material 130 deposited onto the cathode portion 120. More specifically, the weep holes 380 are formed in the material 130 that will define the sidewall of the shell. The weep holes 380 in the material 130 can be utilized to help evacuate electrolyte solution 110 in the receptacle 139 as the first electronic device 300 is inserted into the receptacle 139, particularly when there is no aperture 304 in the build plate 102. In some examples, the weep holes 380 are formed as part of the material deposition process. In other words, the material 130 can be selectively deposited, and not deposited, onto the cathode portion 120 such that the weep holes 380 are defined at those locations where the material 130 is not deposited. Alternatively, in certain examples, the weep holes 380 can be formed after the material 130 is deposited by removing portions of the material 130, such as via a machining technique (e.g., drilling).

In some examples, the first electronic devices are pre-fabricated and coupled to the build plate independently of the deposition of material onto the cathode portion 120. For example, a first electronic devices can be a stand-alone, fully functional electronic device before the device is coupled to the build plate 102. However, in other examples, the first electronic devices are not pre-fabricated, but are fabricated by depositing material onto the cathode portion 120. For example, a first electronic device can be coupled to the build plate 102 by depositing material 130 onto the build plate 102 using an electrochemical additive manufacturing process. In one example, the first electronic device is coupled to the build plate by transmitting electrical energy from the electrical power source 119, through the one or more deposition anodes 111, through the electrolyte solution 110, and to the cathode portion 120 of the build plate 102, such that material 130 is deposited onto the cathode portion 120 to form at least a portion of the first electronic device. In one particular example, the material 130 deposited onto the cathode portion 120 forms electrical wires or conduits of the first electronic device.

The first electronic device of the above examples can be any of various electronic devices that utilize electrical energy to provide a predetermined function or generate electrical energy in response to external stimuli. In some examples, the first electronic device is a sensor or sensing device configured to detect one or more properties of an environment. For example, the first electronic device can be one or more of a thermocouple, strain gauge, calorimeter, piezoelectric sensor, current sensors, voltage sensors, timers, rangefinders, scales, force sensors, pressure sensors, and/or the like.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as logical flow chart diagram. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not adhere to the order of the corresponding steps shown. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for examples may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The described features, structures, or characteristics of the examples may be combined in any suitable manner. In the above description, numerous specific details are provided, such as examples of programming, software modules, user selections, network transactions, database queries, database structures, hardware modules, hardware circuits, hardware chips, etc., to provide a thorough understanding of examples. One skilled in the relevant art will recognize, however, that examples may be practiced without one or more of the specific details, or with other methods, components, materials, and so forth. In other instances, well-known structures, materials, or operations are not shown or described in detail to avoid obscuring aspects of an example.

Aspects of the examples are described above with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the figures illustrate the architecture, functionality, and operation of possible implementations of apparatuses, systems, methods and program products according to various examples. In this regard, each block in the schematic flowchart diagrams and/or schematic block diagrams may represent a module, segment, or portion of code, which comprises one or more executable instructions of the code for implementing the specified logical function(s).

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An electrochemical additive manufacturing method, comprising steps of:

coupling a first electronic device to a build plate;

positioning the build plate into an electrolyte solution such that a cathode portion of the build plate directly contacts the electrolyte solution;

positioning a deposition anode array, comprising a plurality of deposition anodes, into the electrolyte solution such that a gap is established between the cathode portion and the deposition anode array;

connecting the cathode portion of the build plate to a power source;

connecting one or more deposition anodes of the plurality of deposition anodes to the power source; and transmitting electrical energy from the power source, through the one or more deposition anodes of the plurality of deposition anodes, through the electrolyte solution, and to the cathode portion of the build plate, such that material is deposited onto the cathode portion and forms at least a sidewall of a shell that encases the first electronic device against the build plate when the first electronic device is coupled to the build plate, wherein the shell and the first electronic device form a second electronic device;

wherein:

the step of coupling the first electronic device to the build plate occurs after the step of transmitting the electrical energy from the power source through the one or more deposition anodes of the plurality of deposition anodes, through the electrolyte solution, and to the cathode portion of the build plate, such that material is deposited onto the cathode portion;

the material deposited onto the cathode portion also forms a receptacle; and the step of coupling the first electronic device to the build plate comprises inserting the first electronic device into the receptacle.

2. The electrochemical additive manufacturing method according to claim 1, wherein the material forms an entirety of the shell that encases the first electronic device against the build plate.

3. The electrochemical additive manufacturing method according to claim 1, further comprising applying a second material onto the sidewall and over the first electronic device to form a top of the shell.

4. The electrochemical additive manufacturing method according to claim 1, further comprising removing the second electronic device from the build plate.

5. The electrochemical additive manufacturing method according to claim 1, wherein the step of coupling the first electronic device to the build plate comprises adhering the first electronic device to the build plate with an adhesive.

6. The electrochemical additive manufacturing method according to claim 5, wherein:

the adhesive is a hardenable material that is hardendable from a pliable state to a hardened state;

the step of coupling the first electronic device to the build plate comprising attaching the first electronic device to the build plate with the adhesive when the adhesive is in the pliable state; and the electrochemical manufacturing method further comprises, after the material is deposited onto the cathode portion, hardening the adhesive from the pliable state to the hardened state.

7. The electrochemical additive manufacturing method according to claim 1, wherein:

the build plate comprises an aperture; and the step of coupling the first electronic device to the build plate comprises positioning the first electronic device within the aperture.

8. The electrochemical additive manufacturing method according to claim 1, wherein the first electronic device forms a fixed fit with the receptacle.

9. The electrochemical additive manufacturing method according to claim 1, further comprising forming weep holes in the sidewall of the shell, wherein insertion of the first electronic device into the receptacle urges a portion of the electrolyte solution, located within the receptacle, out of the receptacle through the weep holes.

10. The electrochemical additive manufacturing method according to claim 9, wherein the weep holes are formed by selective deposition of the material onto the cathode portion.

11. The electrochemical additive manufacturing method according to claim 9, wherein the weep holes are formed by removing portions of the material after the material is deposited onto the cathode portion.

12. The electrochemical additive manufacturing method according to claim 1, wherein:

the build plate comprises a substrate, made of one of an electrically non-conductive material or a semiconductor material; and the cathode portion is fixed to the substrate.

13. The electrochemical additive manufacturing method according to claim 1, wherein the first electronic device comprises a sensing device.

14. The electrochemical additive manufacturing method according to claim 1, wherein:

the material deposited onto the cathode portion comprises multiple layers;

the steps of positioning the build plate and positioning the deposition anode array into the electrolyte solution comprises adjusting a size of the gap established between the cathode portion and the deposition anode array from a first distance to a second distance, greater than the first distance;

a first layer of the multiple layers of the material is deposited onto the cathode portion when the gap is at the first distance; and a second layer of the multiple layers of the material is deposited onto the first layer of the multiple layers of the material when the gap is at the second distance.

15. An electrochemical additive manufacturing method, comprising steps of:

coupling a first electronic device to a build plate;

positioning the build plate into an electrolyte solution such that a cathode portion of the build plate directly contacts the electrolyte solution;

positioning a deposition anode array, comprising a plurality of deposition anodes, into the electrolyte solution such that a gap is established between the cathode portion and the deposition anode array;

connecting the cathode portion of the build plate to a power source;

connecting one or more deposition anodes of the plurality of deposition anodes to the power source; and transmitting electrical energy from the power source, through the one or more deposition anodes of the plurality of deposition anodes, through the electrolyte solution, and to the cathode portion of the build plate, such that material is deposited onto the cathode portion and forms at least a sidewall of a shell that encases the first electronic device against the build plate when the first electronic device is coupled to the build plate, wherein the shell and the first electronic device form a second electronic device;

wherein the step of coupling the first electronic device to the build plate occurs before the step of transmitting the electrical energy from the power source through the one or more deposition anodes of the plurality of deposition anodes, through the electrolyte solution, and to the cathode portion of the build plate, such that material is deposited onto the cathode portion.

16. The electrochemical additive manufacturing method according to claim 15, wherein the material is deposited onto the cathode portion in direct contact with the first electronic device.

17. The electrochemical additive manufacturing method according to claim 15, wherein the material is deposited onto the cathode portion such that a gap is defined between the material and the first electronic device.

18. The electrochemical additive manufacturing method according to claim 15, wherein:

the build plate comprises a substrate, made of one of an electrically non-conductive material or a semiconductor material; and the cathode portion is fixed to the substrate.

19. The electrochemical additive manufacturing method according to claim 15, wherein:

the material deposited onto the cathode portion comprises multiple layers;

the steps of positioning the build plate and positioning the deposition anode array into the electrolyte solution comprises adjusting a size of the gap established between the cathode portion and the deposition anode array from a first distance to a second distance, greater than the first distance;

a first layer of the multiple layers of the material is deposited onto the cathode portion when the gap is at the first distance; and a second layer of the multiple layers of the material is deposited onto the first layer of the multiple layers of the material when the gap is at the second distance.

20. An electrochemical additive manufacturing method, comprising steps of:

coupling a first electronic device to a build plate;

positioning the build plate into an electrolyte solution such that a cathode portion of the build plate directly contacts the electrolyte solution;

positioning a deposition anode array, comprising a plurality of deposition anodes, into the electrolyte solution such that a gap is established between the cathode portion and the deposition anode array;

connecting the cathode portion of the build plate to a power source;

connecting one or more deposition anodes of the plurality of deposition anodes to the power source; and transmitting electrical energy from the power source, through the one or more deposition anodes of the plurality of deposition anodes, through the electrolyte solution, and to the cathode portion of the build plate, such that material is deposited onto the cathode portion and forms at least a sidewall of a shell that encases the first electronic device against the build plate when the first electronic device is coupled to the build plate, wherein the shell and the first electronic device form a second electronic device;

wherein:

the first electronic device comprises an electrically conductive portion;

the build plate is positioned into the electrolyte solution such that the electrically conductive portion of the first electronic device directly contacts the electrolyte solution; and the electrochemical additive manufacturing method further comprises:

connecting the electrically conductive portion of the first electronic device to the power source; and transmitting electrical energy from the power source, through at least one deposition anode of the plurality of deposition anodes, through the electrolyte solution, and to the electrically conductive portion of the first electronic device, such that material is deposited onto the electrically conductive portion of the first electronic device.

21. The electrochemical additive manufacturing method according to claim 20, wherein:

the first electronic device comprises two electrically conductive portions electrically coupled together to form an electrical node of the first electronic device;

the build plate is positioned into the electrolyte solution such that the electrical node of the first electronic device directly contacts the electrolyte solution;

the electrochemical additive manufacturing method further comprises:

connecting the two electrically conductive portions of the first electronic device to the power source; and transmitting electrical energy from the power source, through at least one deposition anode of the plurality of deposition anodes, through the electrolyte solution, and to the two electrically conductive portions of the first electronic device, such that material is deposited onto the electrical node of the first electronic device.

22. The electrochemical additive manufacturing method according to claim 21, wherein:

the two electrically conductive portions are soldered together; and the electrical node comprises soldered portions of the two electrically conductive portions.

23. The electrochemical additive manufacturing method according to claim 21, wherein:

the two electrically conductive portions are twisted together; and the electrical node comprises twisted portions of the two electrically conductive portions.

24. The electrochemical additive manufacturing method according to claim 21, wherein:

the first electrical device is a thermocouple; and the second electrical device is a calorimeter.

* * * * *